(12) United States Patent
Kawachi

(10) Patent No.: US 7,425,940 B2
(45) Date of Patent: Sep. 16, 2008

(54) LIQUID CRYSTAL PIXEL MEMORY, LIQUID CRYSTAL DISPLAY, AND METHODS OF DRIVING THE SAME

(75) Inventor: Genshiro Kawachi, Yokohama (JP)

(73) Assignee: Advanced LCD Technologies Development Center Co., Ltd., Yokohama (JP)

( * ) Notice: Subject to any disclaimer, the term of this patent is extended or adjusted under 35 U.S.C. 154(b) by 780 days.

(21) Appl. No.: 11/047,756

(22) Filed: Feb. 2, 2005

(65) Prior Publication Data
US 2005/0190133 A1   Sep. 1, 2005

(30) Foreign Application Priority Data
Feb. 9, 2004   (JP)   .............................. 2004-032441

(51) Int. Cl.
G09G 3/36   (2006.01)
(52) U.S. Cl. ........................ 345/98; 345/55; 345/204; 345/205
(58) Field of Classification Search ............... 345/98, 345/55, 204–205
See application file for complete search history.

(56) References Cited

U.S. PATENT DOCUMENTS 4,532,535 A * 7/1985 Gerber et al. ............... 257/318
6,652,776 B2 * 11/2003 Sato et al. ............... 252/299.62

FOREIGN PATENT DOCUMENTS

| JP | 7-36058 | 2/1995 |
| JP | 9-258168 | 10/1997 |
| JP | 9-274200 | 10/1997 |
| JP | 2003-15155 | 1/2003 |
| JP | 2003-149664 | 5/2003 |

* cited by examiner

Primary Examiner—Richard Hjerpe
Assistant Examiner—Leonid Shapiro
(74) Attorney, Agent, or Firm—Oblon, Spivak, McClelland, Maier & Neustadt, P.C.

(57) ABSTRACT

A liquid crystal display includes a pair of support substrates, a liquid crystal layer, and pixel circuits that are arrayed in a matrix and control the alignment state of liquid crystal molecules. Each pixel circuit includes two power terminals set at potentials of opposite polarities, each potential having a predetermined level difference relative to a reference potential, two pixel electrodes that retain charges supplied from the power terminals and apply a potential difference obtained by the retained charges to the liquid crystal layer as a liquid crystal drive voltage, an input transistor that includes a gate electrode, which receives a video signal, and redistributes the charges retained in the pixel electrodes in accordance with the video signal, and a switch circuit that connects the pixel electrodes to the power terminals and connects the pixel electrodes to one and the other of the source and drain electrodes of the input transistor.

32 Claims, 23 Drawing Sheets

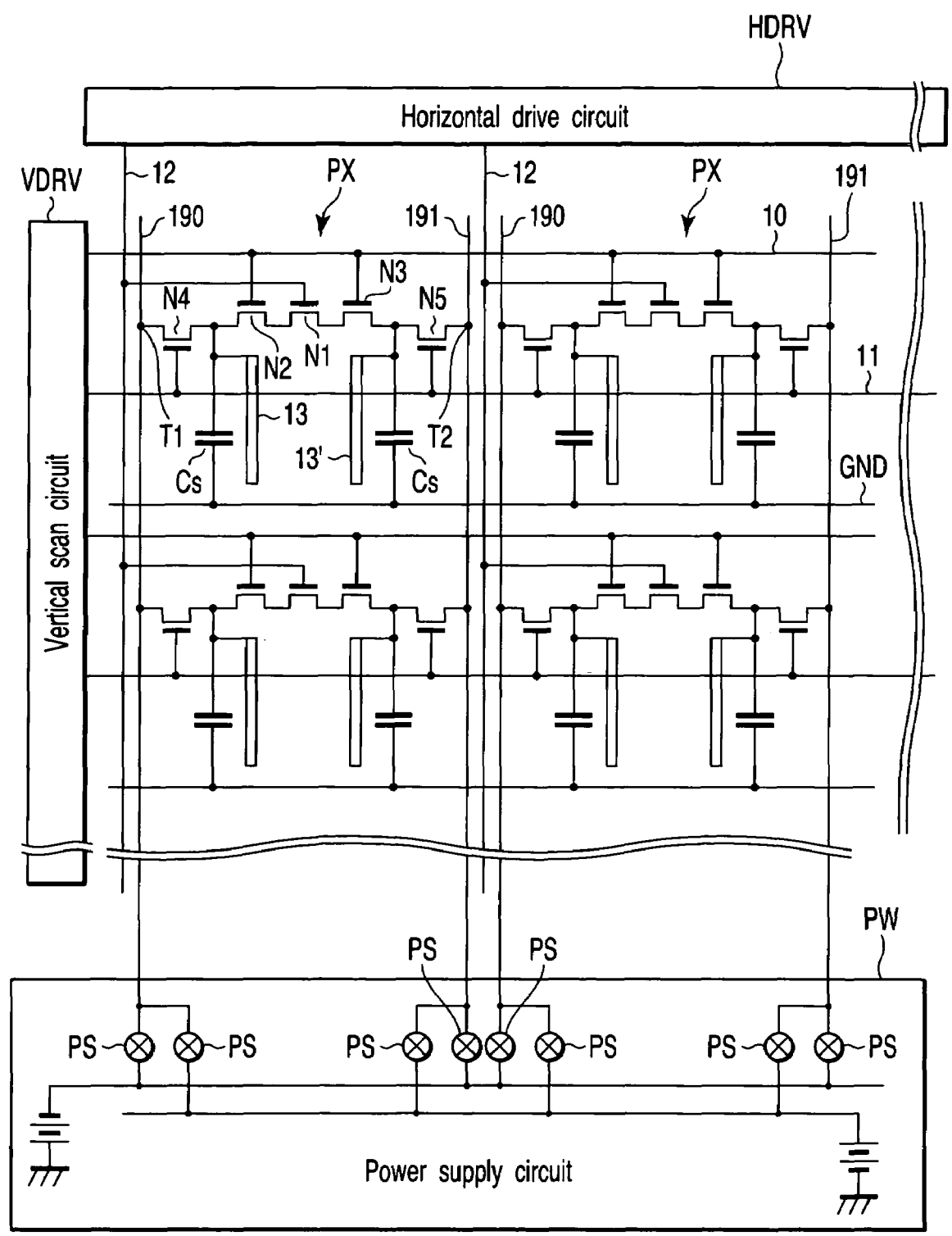
F I G. 2

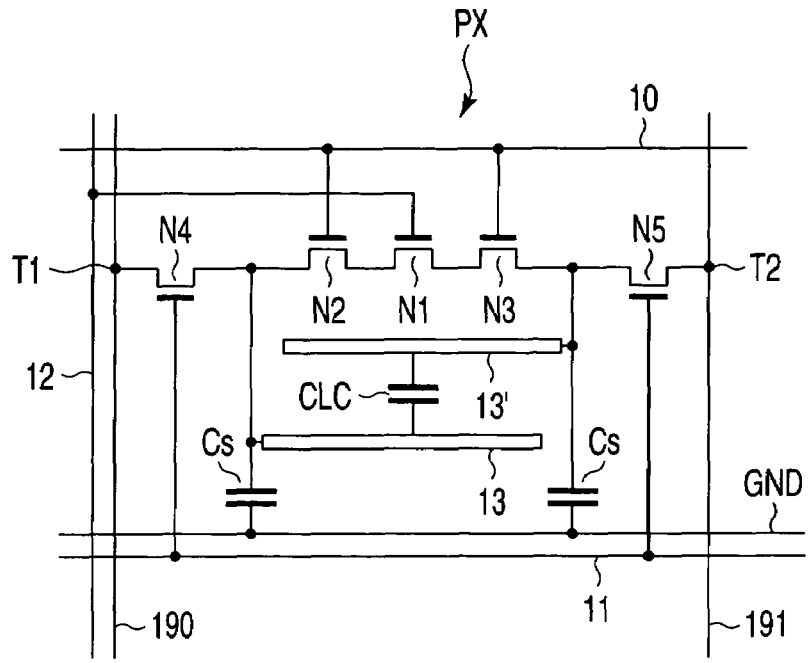
F I G. 3
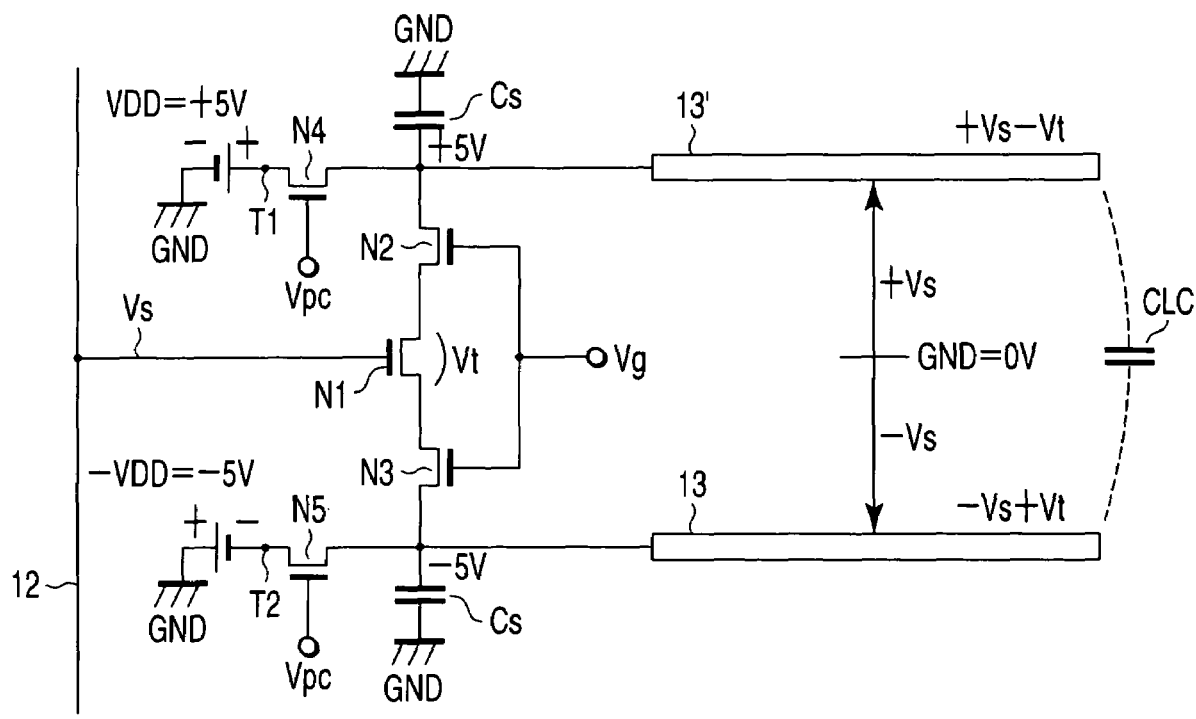
F I G. 4

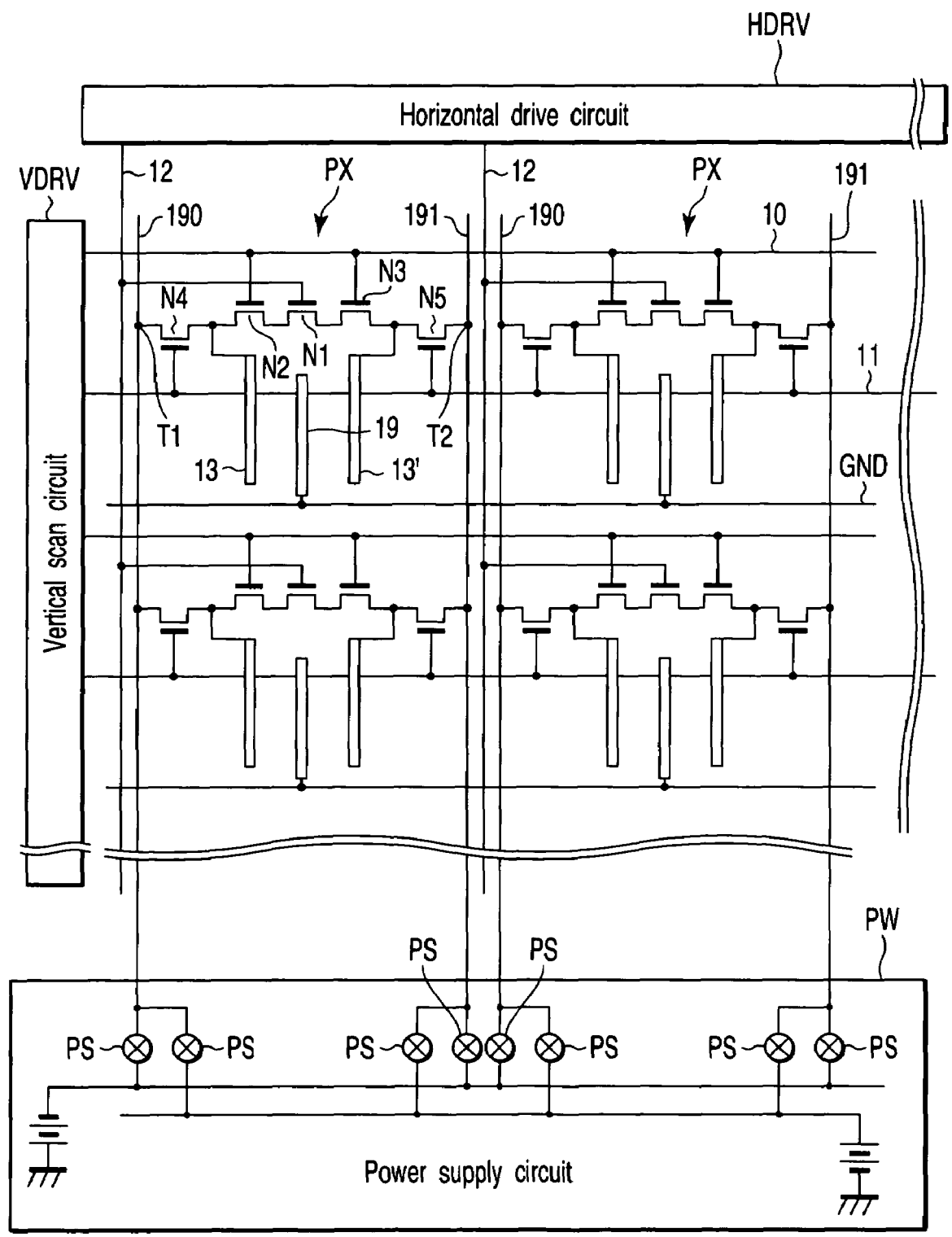
F I G. 12

LIQUID CRYSTAL PIXEL MEMORY, LIQUID CRYSTAL DISPLAY, AND METHODS OF DRIVING THE SAME

CROSS-REFERENCE TO RELATED APPLICATIONS

This application is based upon and claims the benefit of priority from prior Japanese Patent Application No. 2004-032441, filed Feb. 9, 2004, the entire contents of which are incorporated herein by reference.

BACKGROUND OF THE INVENTION

1. Field of the Invention

The present invention relates to a liquid crystal pixel memory, a liquid crystal display, and methods of driving the liquid crystal pixel memory and the liquid crystal display, wherein a liquid crystal drive voltage, the polarity of which is cyclically reversed in order to control the alignment state of liquid crystal molecules, is applied to a liquid crystal layer.

2. Description of the Related Art

An active matrix liquid crystal display, for example, is used in OA apparatuses or other various apparatuses as a display device for displaying information such as characters and graphics. This liquid crystal display is a display panel that has, in usual cases, such a structure that a liquid crystal layer is held between a pair of substrates. In this display panel, a plurality of pixels are arrayed in a matrix, thereby forming a display screen. Each pixel is driven via a thin film transistor (TFT).

In a conventional active matrix liquid crystal display, a plurality of pixels are driven by, in usual cases, a line-at-a-time driving method. In the line-at-a-time driving method, a plurality of pixels are successively selected in units of rows that form a single horizontal line. A video signal for a single horizontal line is supplied to the pixels of the selected row. Each pixel has a pixel capacitance that is charged and discharged by the associated video signal. This pixel capacitance includes a liquid crystal capacitance, which is obtained between a pair of electrodes that apply a voltage of the video signal to the liquid crystal layer as a liquid crystal drive voltage, and a storage capacitance that is connected in parallel to this liquid crystal capacitance. The alignment of liquid crystal molecules is controlled by an electric field that is created between the pair of electrodes according to the liquid crystal drive voltage. The liquid crystal drive voltage varies in cycles of one frame period, which is a refresh period of the video signal.

If the alignment state of liquid crystal molecules is continuously controlled by a unidirectional electric field, non-uniform distribution of liquid crystal molecules occurs in the liquid crystal layer. The non-uniform distribution makes the liquid crystal display inoperable, so the polarity of the liquid crystal drive voltage needs to be reversed in cycles of, e.g. one frame period. Further, in a case where dot-reversal driving is executed in order to suppress flicker, the alignment state of liquid crystal molecules is controlled by liquid crystal drive voltages of polarities that are opposite between adjacent pixels. In this case, a video signal for one horizontal line is supplied to the pixels of the selected row via a plurality of signal lines, with the polarity of the video signal being reversed in cycles of each horizontal scan period. Specifically, a signal line driver LSI drives a plurality of video signal lines in accordance with the video signal for one horizontal line. Since parasitic wiring capacitances on the signal lines are charged/discharged by the polarity that is reversed by the driver LSI in cycles of one horizontal scan period, the power consumption of the driver LSI is very large. The power consumption P of the driver LSI is approximately given by $$P = C_L \cdot f_F \cdot N_S \cdot V_{SIG}^2$$

where $C_L$ is the total wiring capacitance of the signal lines, $f_F$ is the frame frequency, $N_S$ is the number of scan lines, and $V_{SIG}$ is a maximum amplitude (Peak-to-Peak value) of the video signal. If the size and resolution of the display panel of the liquid crystal display are increased, both the wiring capacitance for a video signal and the clock frequency of the drive circuit will increase. It is thus understood that the power consumption of the signal line driver LSI will rise at an increasing rate. As a measure to solve this problem, first prior art is proposed (see, e.g. Jpn. Pat. Appln. KOKAI Publication No. 9-258168 and Jpn. Pat. Appln. KOKAI Publication No. 9-274200). According to the first prior art, an increase in power consumption is suppressed, for example, by providing a memory element of an SRAM structure in each pixel circuit and thinning out the video signal on a frame-by-frame basis.

Further, in the active matrix liquid crystal display, how to increase the image quality is also a technical problem to be solved. As regards this problem, a liquid crystal display with an in-plane switching scheme is proposed as second prior art (see, e.g. Jpn. Pat. Appln. KOKAI Publication No. 07-036058, Jpn. Pat. Appln. KOKAI Publication No. 2003-149664 and Jpn. Pat. Appln. KOKAI Publication No. 2003-15155). In the liquid crystal display with an in-plane switching scheme, a pair of pixel electrodes are provided in each of the pixel areas of one of the substrates, and a lateral electric field, which is substantially parallel to the plane of the electrode, that is, the surface of the substrate, is created in the liquid crystal layer. Thereby, liquid crystal molecules are rotated in the plane to effect a multi-gradation display. Hence, a high contrast ratio and high color reproducibility can be realized within a wider field of view.

In the first prior art, the memory elements in the pixel circuits are digital memories. Thus, in order to perform an ordinary multi-gradation display, it is necessary to provide memory elements in number corresponding to the number of gradations for display, and signal lines for supplying signals to the memory elements. For example, in order to enable a display in 64 gradations, it is necessary to provide memory elements for six bits, as well as six signal lines, within the pixel area of each of all the pixels. If such a number of elements and lines are actually provided within the limited pixel area, the aperture ratio and manufacturing yield will deteriorate. Thus, it is difficult to present a low-power-consumption, high-image-quality liquid crystal display at low cost.

In the second prior art, the image quality of the liquid crystal display can be enhanced, but no consideration is given to the problem of power consumption of the signal line driver LSI. Each pixel is configured to directly supply a video signal coming from a signal line driven by the driver LSI and sampled by a sampling transistor to the liquid crystal layer as a liquid crystal drive voltage. In this configuration, an increase in power consumption of the signal line driver LSI cannot be suppressed.

BRIEF SUMMARY OF THE INVENTION

The present invention has been made in order to solve the above-described problems, and the object of the invention is to provide a liquid crystal pixel memory, a liquid crystal display, and methods of driving the same, wherein a high image quality can be obtained without an increase in power consumption.

According to a first aspect of the present invention, there is provided a liquid crystal pixel memory comprising: first and second power terminals that are set at potentials of opposite polarities, respectively, each of the potentials having a predetermined level difference relative to a reference potential; first and second pixel electrodes that retain charges supplied from the first and second power terminals, respectively, and apply a potential difference obtained by the retained charges to a liquid crystal layer as a liquid crystal drive voltage that creates within the liquid crystal layer a lateral electric field that is substantially horizontal to a plane of a substrate; an input transistor having source and drain electrodes and a gate electrode connected to a video signal line; a pair of first switch transistors that are connected between the first pixel electrode and the first power terminal and between the second pixel electrode and the second power terminal, respectively, to precharge the first and second pixel electrodes at the potentials of the first and second power terminals; and a pair of second switch transistors that are connected between the source electrode of the input transistor and the first pixel electrodes and between the drain electrode of the input transistor and the second pixel electrode, respectively, to redistribute the charges retained in the first and second pixel electrodes in accordance with a value of a video signal that is input to the gate electrode of the input transistor.

According to a second aspect of the present invention, there is provided a method of driving a liquid crystal pixel memory including: first and second power terminals that are set at potentials of opposite polarities, respectively, each of the potentials having a predetermined level difference relative to a reference potential; first and second pixel electrodes that retain charges supplied from the first and second power terminals, respectively, and apply a potential difference obtained by the retained charges to a liquid crystal layer as a liquid crystal drive voltage that creates within the liquid crystal layer a lateral electric field that is substantially horizontal to a plane of a substrate; and an input transistor having a gate electrode that receives a video signal, the method comprising: a step of connecting the first and second pixel electrodes to the first and second power terminals to precharge the first and second pixel electrodes at the potentials of the first and second power terminals; and a step of disconnecting the first and second pixel electrodes from the first and second power terminals and then connecting the first and second pixel electrodes to source and drain electrodes of the input transistor to redistribute the charges retained in the first and second pixel electrodes in accordance with a value of the video signal that is input to the gate electrode of the input transistor, thereby determining the potentials of the first and second pixel electrodes.

According to a third aspect of the present invention, there is provided a liquid crystal display comprising: a pair of support substrates; a liquid crystal layer that is held between the pair of support substrates; and a plurality of pixel circuits that are arrayed in a matrix on one of the support substrates and control the alignment state of liquid crystal molecules, each of the pixel circuits including: first and second power terminals that are set at potentials of opposite polarities, respectively, each of the potentials having a predetermined level difference relative to a reference potential; first and second pixel electrodes that retain charges supplied from the first and second power terminals, respectively, and apply a potential difference obtained by the retained charges to the liquid crystal layer as a liquid crystal drive voltage that creates within the liquid crystal layer a lateral electric field that is substantially horizontal to a plane of the substrate; an input transistor having source and drain electrodes and a gate electrode that receives a video signal; and a switch circuit having a function of connecting the first and second pixel electrodes to the first and second power terminals to precharge the first and second pixel electrodes at the potentials of the first and second power terminals, and connecting the first and second pixel electrodes to one and the other of the source and drain electrodes of the input transistor to redistribute the charges retained in the first and second pixel electrodes in accordance with a value of the video signal that is input to the gate electrode of the input transistor.

According to a fourth aspect of the present invention, there is provided a liquid crystal display comprising: a liquid crystal layer that is provided between a pair of support substrates; a plurality of pixel circuits that are arrayed in a matrix on one of the support substrates and control the alignment state of liquid crystal molecules; a plurality of first address lines that are arranged along the rows of pixel circuits; a plurality of precharge control lines; a plurality of second address lines that are arranged along the columns of pixel circuits; and a plurality of video signal lines that are arranged along the columns of pixel circuits, wherein each of the pixel circuits is disposed in one of pixel areas that are defined by the first address lines and the second address lines, each of the pixel circuits includes first and second power terminals that are set at potentials of opposite polarities, respectively, each of the potentials having a predetermined level difference relative to a reference potential; first and second pixel electrodes that retain charges supplied from the first and second power terminals, respectively, and apply a potential difference obtained by the retained charges to the liquid crystal layer as a liquid crystal drive voltage that creates within the liquid crystal layer a lateral electric field that is substantially horizontal to a plane of the substrate; an input transistor having a gate, source and drain electrodes; first and second connection transistors each having a gate electrode connected to one of the precharge control lines; a third connection transistor having a gate electrode connected to one of the first address lines; and a fourth connection transistor having a gate electrode connected to one of the first address lines, the first and second pixel electrodes are connected to the first and second power terminals via source and drain electrodes of the first and second connection transistors, and the first and second pixel electrodes are connected to one and the other of the source and drain electrodes of the input transistor via source and drain electrodes of the third and fourth connection transistors, and the gate electrode of the input transistor is connected to receive a video signal from one of the video signal lines.

According to a fifth aspect of the present invention, there is provided a method of driving a liquid crystal display including: a pair of support substrates; a liquid crystal layer that is provided between the pair of support substrates; and a plurality of pixel circuits that are arrayed in a matrix on one of the support substrates and control the alignment state of liquid crystal molecules, each of the pixel circuits including: first and second power terminals that are set at potentials of opposite polarities, respectively, each of the potentials having a predetermined level difference relative to a reference potential; first and second pixel electrodes that retain charges supplied from the first and second power terminals, respectively, and apply a potential difference obtained by the retained charges to the liquid crystal layer as a liquid crystal drive voltage that creates within the liquid crystal layer a lateral electric field that is substantially horizontal to a plane of the substrate; and an input transistor having a gate electrode that receives a video signal and redistributes the charges retained in the first and second pixel electrodes in accordance with the video signal, the method comprising: a step of connecting the first and second pixel electrodes to the first and second power terminals to precharge the first and second pixel electrodes at the potentials of the first and second power terminals; and a step of disconnecting the first and second pixel electrodes from the first and second power terminals and then connecting the first and second pixel electrodes to source and drain electrodes of the input transistor to redistribute the charges retained in the first and second pixel electrodes in accordance with a value of the video signal that is input to the gate electrode of the input transistor, thereby determining potentials of the first and second pixel electrodes.

The present invention can provide a liquid crystal pixel memory, a liquid crystal display, and methods of driving the same, wherein a high image quality can be obtained without an increase in power consumption.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 schematically shows the plan-view structure of the liquid crystal display shown in FIG. 1;

FIG. 3 shows an equivalent circuit of one of pixel circuits that are arrayed in a matrix in the liquid crystal display shown in FIG. 2;

FIG. 4 illustrates the operational principle of the pixel circuit shown in FIG. 3;

FIG. 12 schematically shows the plan-view structure of a transmission-type active matrix liquid crystal display according to a second embodiment of the present invention;

DETAILED DESCRIPTION OF THE INVENTION

Figure 1:
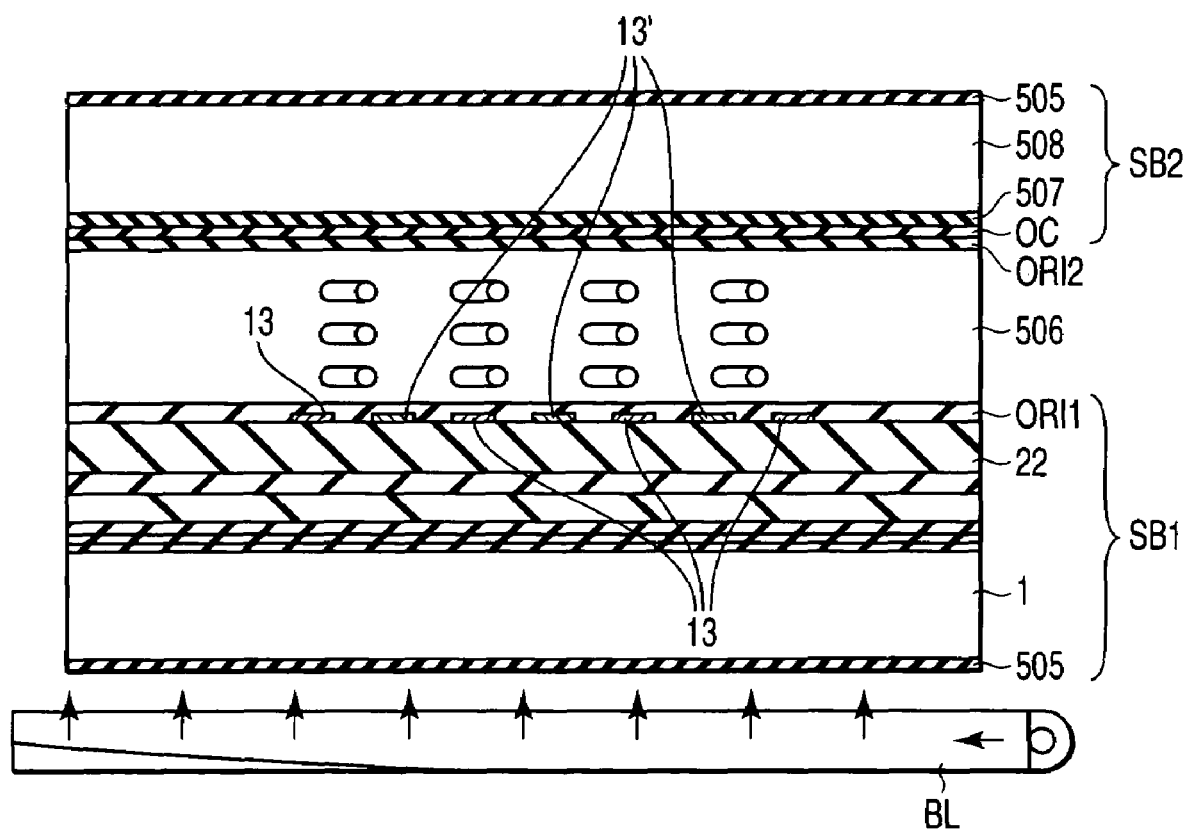
FIG. 1 shows the cross-sectional structure of a transmission-type active matrix liquid crystal display according to a first embodiment of the present invention.

The above-mentioned liquid crystal pixel memory, liquid crystal display and methods of driving the same are common with respect to the following technical matters. First and second pixel electrodes are connected to first and second power terminals, respectively. Thereby, the first and second pixel electrodes are precharged at potentials of the first and second power terminals, respectively. Since the first and second power terminals are set at potentials of opposite polarities, each having a predetermined level difference relative to a reference level, the first and second pixel electrodes retain charges at opposite polarities. The first and second pixel electrodes are connected to one end and the other end of a current path of an input transistor. Thereby, the charges that are retained in the first and second pixel electrodes are redistributed by the input transistor. In other words, canceling of charges is effected between the first and second pixel electrodes, and the potentials of the first and second pixel electrodes are varied. Assuming that a video signal voltage is Vs and the threshold voltage of the input transistor is Vt, the ultimate potentials of the first and second pixel electrodes become Vs−Vt and −Vs+Vt, respectively. For example, in a case where the video signal voltage Vs of −2.5V is input to the NMOS input transistor having the threshold voltage of 0.5V, the first pixel electrode is set at Vs−Vt=−2.5−0.5=−3V, and the second pixel electrode is set at −Vs+Vt=−(−2.5)+0.5=3V. Accordingly, a potential difference of 6V is obtained as a liquid crystal drive voltage between the first and second pixel electrodes. The polarity of the liquid crystal drive voltage is cyclically reversed by repeatedly reversing the relationship in potential between the first and second power terminals. Specifically, two AC voltages, each of which has a rectangular waveform with a level shift between, e.g. +5V (high level) and −5V (low level), may be applied to the first and second power terminals with a complementary phase relationship of 180°.

In this case, refreshing of the video signal is not needed in order to reverse the polarity of the liquid crystal drive voltage. In other words, if the liquid crystal voltage that is proportional to the video signal voltage Vs is retained in the liquid crystal capacitance between the first and second pixel electrodes, the polarity of the liquid crystal drive voltage can be reversed at any time. Therefore, this scheme can be used in order to reduce the update frequency, i.e. the video refresh rate, with which a video signal processing circuit such as a signal line driver LSI refreshes a video signal for one frame, and to reduce the power consumption in this video signal processing circuit. Moreover, since the video signal voltage itself is not used as the liquid crystal drive voltage that requires cyclic polarity reversal, it is possible to supply, as a video signal, a unipolar analog voltage having a maximum amplitude that is half the maximum amplitude in the prior art. Thereby, the power that is consumed to drive the signal line in accordance with the video signal voltage can be reduced. Furthermore, since the structure of the video signal circuit can be simplified, the manufacturing cost of the driver LSI can be reduced.

First Embodiment

A transmission-type active matrix liquid crystal display according to a first embodiment of the present invention will now be described with reference to the accompanying drawings. The structure of the transmission-type active matrix liquid crystal display is first described.

FIG. 1 shows the cross-sectional structure of the transmission-type active matrix liquid crystal display. FIG. 2 schematically shows an equivalent circuit of this liquid crystal display. FIG. 3 shows an equivalent circuit of one of pixel circuits PX that are arrayed in a matrix in the liquid crystal display shown in FIG. 2.

The liquid crystal display has a structure that a liquid crystal layer 506 is held between a pair of support substrates SB1 and SB2, as shown in FIG. 1, for example. The support substrate SB1 is formed by stacking a protection insulation film 22, etc. on a glass substrate 1. As is shown in FIG. 2, the support substrate SB1 includes a plurality of pixel circuits PX arrayed in a matrix; a plurality of scan lines 10 arranged along the rows of pixel circuits PX (i.e. in a horizontal direction on the screen); a plurality of precharge control lines 11 arranged along the rows of pixel circuits PX, like the scan lines 10; a plurality of video signal lines 12 arranged along the columns of pixel circuits PX; a vertical scan circuit VDRV that drives the scan lines 10 and precharge control lines 11; and a horizontal drive circuit HDRV that drives the video signal lines 12. The pixel circuits PX are respectively located in pixel areas, which are defined substantially by the scan lines 10 and video signal lines 12. In these pixel areas, the pixel circuits PX control the alignment state of liquid crystal molecules. The support substrate SB2 is formed by stacking a color filter, a color filter protection film OC, etc. on a glass substrate 508. The support substrates SB1 and SB1 include a lower alignment film ORI1 and an upper alignment film ORI2, respectively, which are formed adjacent to the liquid crystal layer 506 so as to determine the alignment directions of liquid crystal molecules.

The support substrates SB1 and SB2 are independently fabricated, and then the support substrates SB1 and SB2 are bonded by a sealing member (not shown) that is added to outer peripheral parts thereof. The liquid crystal layer 506 is obtained by injecting and sealing a liquid crystal composition in the space surrounded by the sealing member between the support substrates SB1 and SB2.

A pair of polarizer plates 505 are attached to those exposed surfaces of the glass substrates 1 and 508, which are opposed to the alignment films ORI1 and ORI2. The polarized-light transmission axes of the polarizer plates 505 are set in a cross-Nicol. A backlight BL is disposed adjacent to the polarizer plate 505 that is attached to the surface of the glass substrate 1. Light from the backlight BL is optically modulated by the liquid crystal layer 506 under the control of each pixel circuit PX.

Each pixel circuit PX shown in FIG. 2 includes first and second power terminals T1 and T2, first and second pixel electrodes 13 and 13', and first to fifth transistors N1, N2, N3, N4 and N5. The power terminals T1 and T2 are set at potentials of opposite polarities, each of which has a predetermined level difference with respect to a reference potential. The reference potential is equal to the potential of a common electrode GND that is provided for grounding of all pixel circuits PX. The first pixel electrode 13 is capacitive-coupled to the common electrode GND, thereby constituting a first storage capacitance Cs. The second pixel electrode 13' is capacitive-coupled to the common electrode GND, thereby constituting a second storage capacitance Cs. Thus, the pixel electrodes 13 and 13' retain charges that are supplied from the first and second power terminals T1 and T2, and apply a potential difference, which is obtained by the retained charges, to the liquid crystal layer as a liquid crystal drive voltage that creates a substantially lateral electric field within the liquid crystal layer. The first transistor N1 is an input transistor that has a gate for receiving a video signal and redistributes the charge retained by the first pixel electrode 13 and the charge retained by the second pixel electrode 13' in accordance with the video signal. The liquid crystal drive voltage is retained by a liquid crystal capacitance CLC between the first and second pixel electrodes 13 and 13'. The second to fifth transistors N2, N3, N4 and N5 are connection transistors and constitute a switch circuit. The fourth and fifth transistors N4 and N5, in the on-state, electrically connect the first and second pixel electrodes 13 and 13' to the first and second power terminals T1 and T2, respectively, thereby to precharge the first and second pixel electrodes 13 and 13' at the potentials of the first and second power terminals T1 and T2. The first and second pixel electrodes 13 and 13' are connected to one end and the other end of a current path of the first transistor N1 so that the first transistor N1 may redistribute the charges that are retained in the first and second pixel electrodes 13 and 13'.

Specifically, the transistors N1 to N5 are all N-channel thin-film transistors (TFT). The pixel electrodes 13 and 13' are connected to the sources of the transistors N4 and N5. The transistor N1 has a gate connected to the video signal line 12, a drain connected to a drain of the transistor N2, and a source connected to a drain of the transistor N3. The transistors N2 and N3 have gates connected to the scan line 10, and the transistors N4 and N5 have gates connected to the precharge control line 11 parallel to the scan line 10. The transistors N4 and N5 have drains connected to the power terminals T1 and T2, respectively.

On the support substrate SB1, pairs of first and second power lines 190 and 191, like the video signal lines 12, are disposed along the columns of pixel circuits PX. The first and second power terminals T1 and T2 of each pixel circuit PX are branch points provided on the paired first and second power lines 190 and 191. The power lines 190 and 191 are connected to a power supply circuit PW, and are set at one and the other of a positive power source potential VDD (=+5V) and a negative power source potential–VDD (=–5V), each of which has a predetermined level difference relative to the reference potential of, e.g. 0V. The power supply circuit PW includes a plurality of switches PS that are driven so as to reverse the relationship in potential between the power line 190 and power line 191 at predetermined cycles of, e.g. one frame.

The vertical scan circuit VDRV and horizontal scan circuit HDRV are formed as driver LSI units. The vertical scan circuit VDRV generates select pulse voltages Vg and Vpc that are successively supplied to the scan lines 10 and precharge control lines 11 to select a row of pixel circuits. In the selected row, the select pulse voltage Vpc is output prior to the select pulse voltage Vg. The horizontal drive circuit HDRV supplies a video signal for one horizontal line to the video signal lines 12 in the duration of the select pulse voltage Vg.

FIG. 4 illustrates the operational principle of the pixel circuit PX shown in FIG. 3. In FIG. 4, the depiction of wiring lines is simplified. When the select pulse voltage Vpc is input, the transistors N4 and N5 are turned on and rendered conductive upon rising of the pulse of this select pulse voltage Vpc, thereby connecting the pixel electrodes 13 and 13' to the power terminals T1 and T2. Thus, the pixel electrodes 13 and 13' are precharged at the potentials of the first and second power terminals T1 and T2. The select pulse voltage Vpc falls after the precharge, and turns off the transistors N4 and N5. Then, the select pulse voltage Vg that is applied from the scan line 10 rises, thereby turning on the transistors N2 and N3 and connecting the image electrodes 13 and 13' to one end and the other end of the current path of the transistor N1. Thus, the charges retained in the pixel electrodes 13 and 13' are redistributed by the transistor N1. The potential difference between the pixel electrodes 13 and 13' is applied as a liquid crystal drive voltage VLC to the liquid crystal layer 506. The select pulse voltage Vpc falls after the redistribution of charges. The transistors N2 and N3 are turned off (at the time of falling). Then, the liquid crystal drive voltage VLC is retained by a liquid crystal capacitance CLC. The liquid crystal drive voltage VLC has a value that corresponds to the video signal voltage Vs within the range of the potential difference between the power lines 190 and 191, that is, between the power terminals T1 and T2. In short, the alignment state of the liquid crystal between the pixel electrodes 13 and 13' is controlled by the video signal voltage Vs to effect a display.

Figure 5:
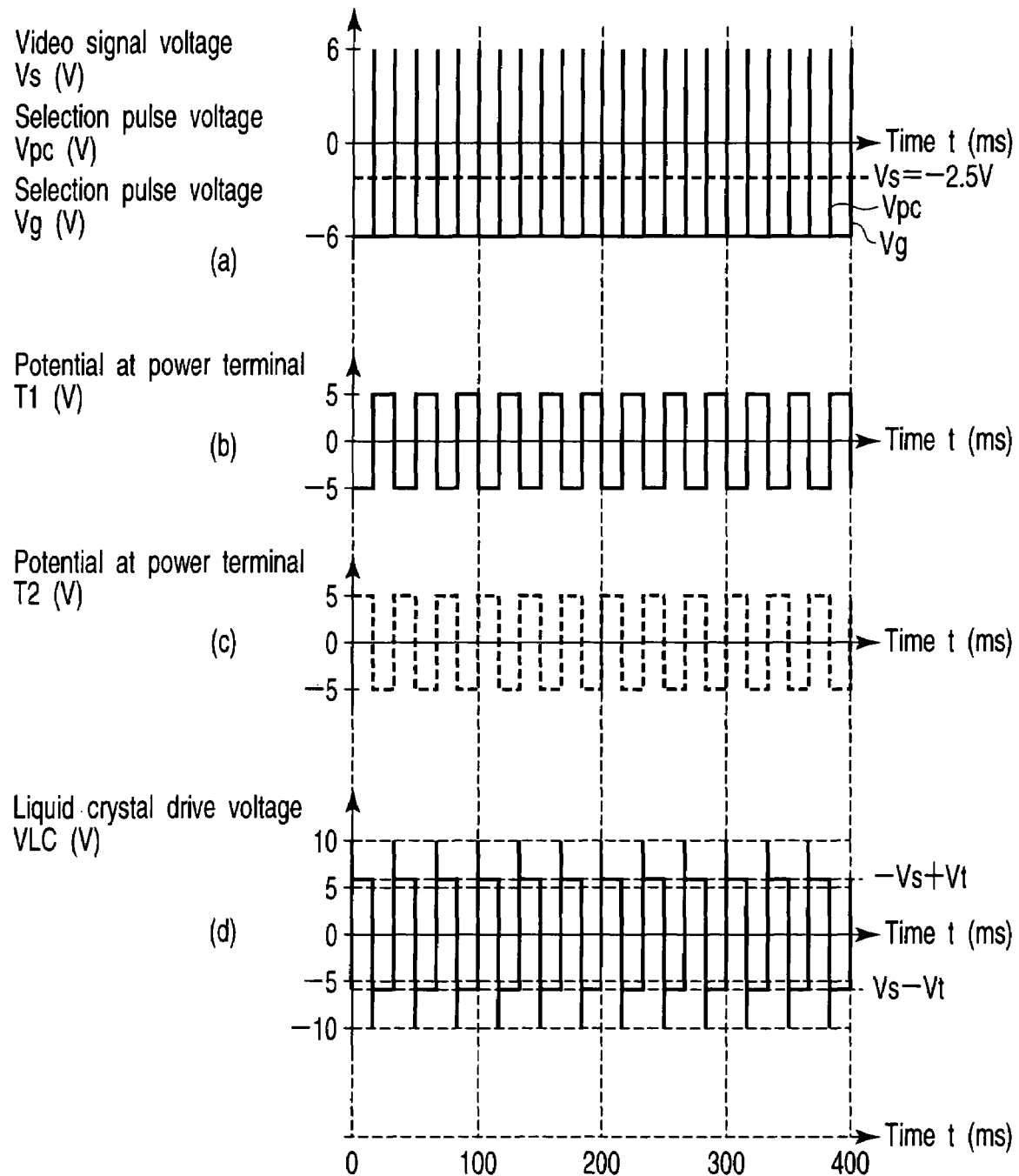
FIG. 5 is a time chart showing the voltage waveforms of the pixel circuit of FIG. 3 in a plurality of frame periods.
Figure 6:
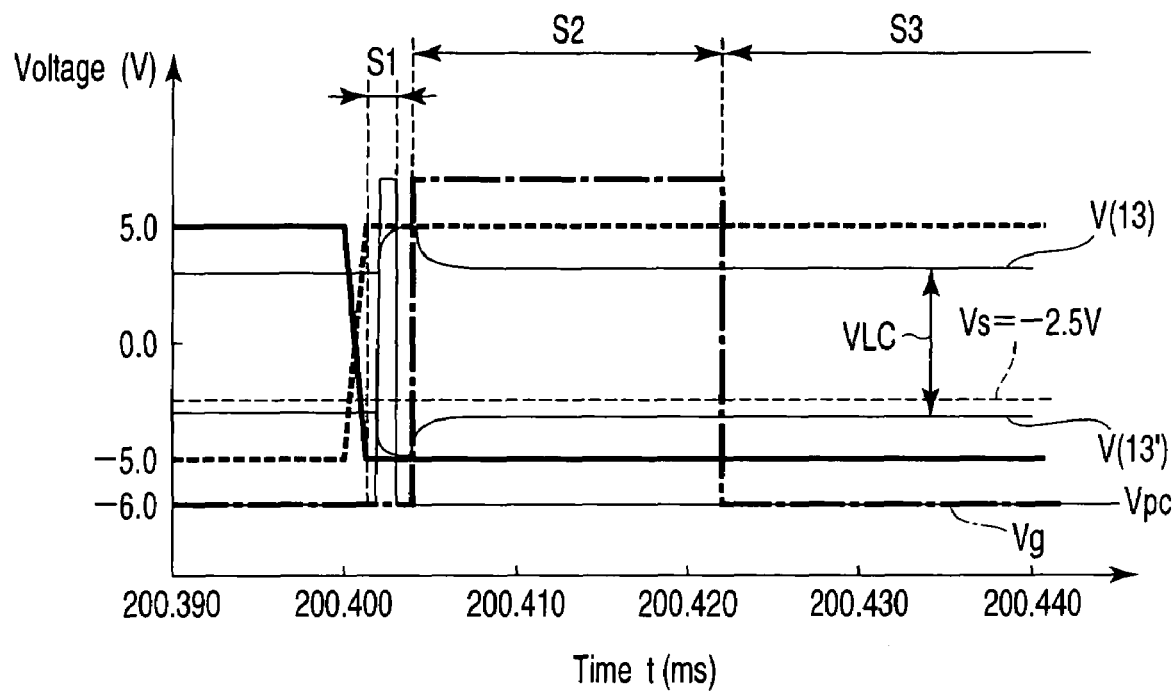
FIG. 6 is a time chart showing the voltage waveforms of the pixel circuit of FIG. 3 in one frame period.

The operation of the pixel circuit PX is further described referring to FIG. 5. FIG. 5 illustrates the voltage waveforms of the pixel circuit PX in a plurality of frame periods. FIG. 6 illustrates the voltage waveforms of the pixel circuit PX in one frame period. In FIG. 6, the voltage waveforms are depicted in an overlapping fashion in order to clarify the transition timing thereof. As is shown in FIG. 6, the operation of the pixel circuit PX comprises three steps: a precharge step S1, a video write step S2 and a video retention step S3. In the precharge step S1, the pixel electrodes 13 and 13' are precharged to the potentials of the power terminals T1 and T2 (display standby state). In the video write step S2, the liquid crystal drive voltage VLC corresponding to the video signal voltage Vs is set in the liquid crystal capacitance CLC by redistributing charges that are retained in the pixel electrodes 13 and 13' (display state). In the video retention step S3, the liquid crystal drive voltage VLC that is set in the liquid crystal capacitance CLC is retained (display state). This retention step may also be used as a liquid crystal image memory step.

In this case, two rectangular-waveform AC voltages, which are phase-shifted by 180°, are applied to the power terminals T1 and T2 via the power lines 190 and 191. The potentials of the power terminals T1 and T2 are cyclically reversed, as shown in parts (b) and (c) of FIG. 5. The cycle of each rectangular-waveform AC voltage is, e.g. 16.7 ms, and the amplitude thereof is, e.g. ±5V.

In the precharge step S1, the transistors N4 and N5 are turned on upon rising of the select pulse voltage Vpc that is supplied via the precharge control line 11. Thus, the transistors N4 and N5 precharge the pixel electrodes 13 and 13' at potentials +VDD and –VDD, which are set at the power terminals T1 and T2 via the power lines 190 and 191. If the capacitance between the pixel electrode 13 and common electrode GND and the capacitance between the pixel electrode 13' and common electrode GND are Cs, a charge of +VDD·Cs and a charge of –VDD·Cs are retained in the pixel electrodes 13 and 13'. For example, the select pulse voltage Vpc has a cycle of 16.7 ms, a pulse width of 2 µs and an amplitude of ±6V.

In the video write step S2, the transistors N4 and N5 are turned off upon falling of the select pulse voltage Vpc. When a video signal voltage Vs with a negative value is supplied to the video signal line 12 from the horizontal drive circuit HDRV, the video signal voltage Vs is further supplied from the video signal line 12 to the gate electrode of the transistor N1. In FIG. 5 and FIG. 6, it is assumed that the video signal voltage Vs=–2.5V. While the video signal voltage Vs is being supplied, the transistors N2 and N3 are turned on upon rising of the select pulse voltage Vg that is supplied from the scan line 10 of the selected row. Thereby, the pixel electrodes 13 and 13' are connected to one end and the other end of the current path of the transistor N1. The select pulse voltage Vg has as a cycle of 16.7 ms, a pulse width of 17 µs, and an amplitude of ±6V. Since the transistor N1 is set at a fixed channel conductance corresponding to the video signal voltage Vs, this causes canceling of the charges that are retained in the pixel electrodes 13 and 13' with opposite polarities.

If the threshold voltage is Vt, the potential V(13') of the pixel electrode 13' asymptotically approaches Vs–Vt. Ultimately, a charge of (Vs–Vt)·Cs remains in the pixel electrode 13'. The amount of canceled charge is (VDD–Vs–Vt)·Cs. Since the same amount of positive charge is lost from the pixel electrode 13, the ultimate potential V(13) of the pixel electrode 13 is given by $$\{VDD-(VDD+Vs-Vt)\}\cdot Cs/Cs=-Vs+Vt.$$

Thus, the potential difference between the pixel electrodes 13 and 13', that is, the liquid crystal drive voltage VLC, converges to a fixed value of 2·(–Vs+Vt).

In the video retention step S3, the select pulse voltage Vg falls after the convergence of the liquid crystal drive voltage VLC, and turns off the transistors N2 and N3. In this state, even if the gate voltage of the transistor N1 varies, the potentials V(13) and V(13') of the pixel electrodes 13 and 13' do not vary.

The above-described precharge step S1, video write step S2 and video retention step S3 are repeated each time the relationship in potential between the power lines 190 and 191 is reversed. The potentials V(13) and V(13') of the pixel electrodes 13 and 13' vary accordingly, and the polarity of the liquid crystal drive voltage VLC that is applied to the liquid crystal layer 506 is reversed, as illustrated in part(d) of FIG. 5. The peak-to-peak value of the liquid crystal drive voltage VLC is 2·(−Vs+Vt), and the cycle of polarity reversal is 16.7 ms. As is shown in part (d) of FIG. 5, a spike-like voltage variation occurs in the liquid crystal drive voltage VLC at cycles of half the value of 16.7 ms. This phenomenon occurs because the pixel electrodes 13 and 13' are set at ±5V by the precharging operation. Since the spike-like varying voltage has a small pulse width, the AC effective value of the liquid crystal drive voltage VLC is hardly affected and thus there is no problem with the operation.

Figure 7:
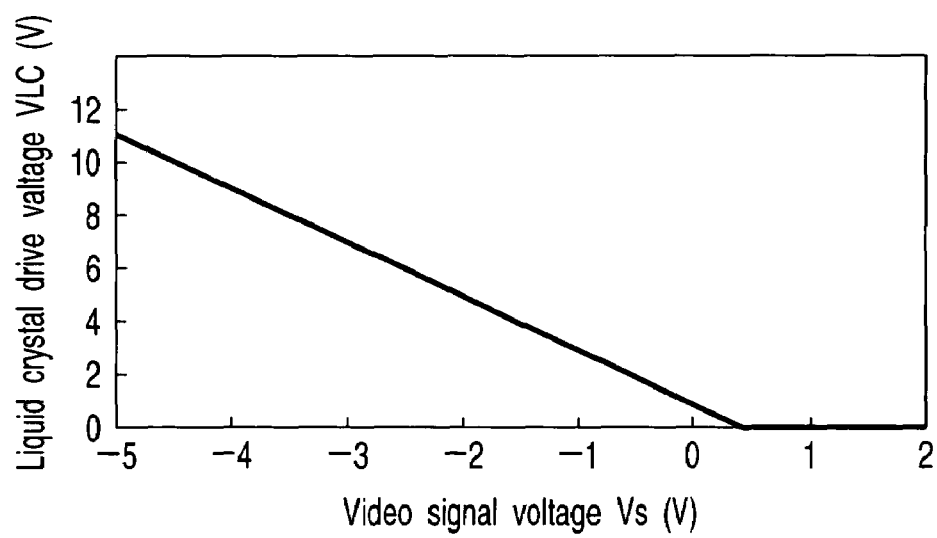
FIG. 7 is a graph showing the voltage input/output characteristic of the pixel circuit shown in FIG. 3.

FIG. 7 shows the voltage input/output characteristic of the pixel circuit PX, which is obtained when the threshold voltage Vt of the transistor N1 is Vt=0.5V. For example, when the video signal voltage Vs=−2.5V, a liquid crystal drive voltage VLC of 6Vp-p is applied to the liquid crystal layer 506.

Figure 8:
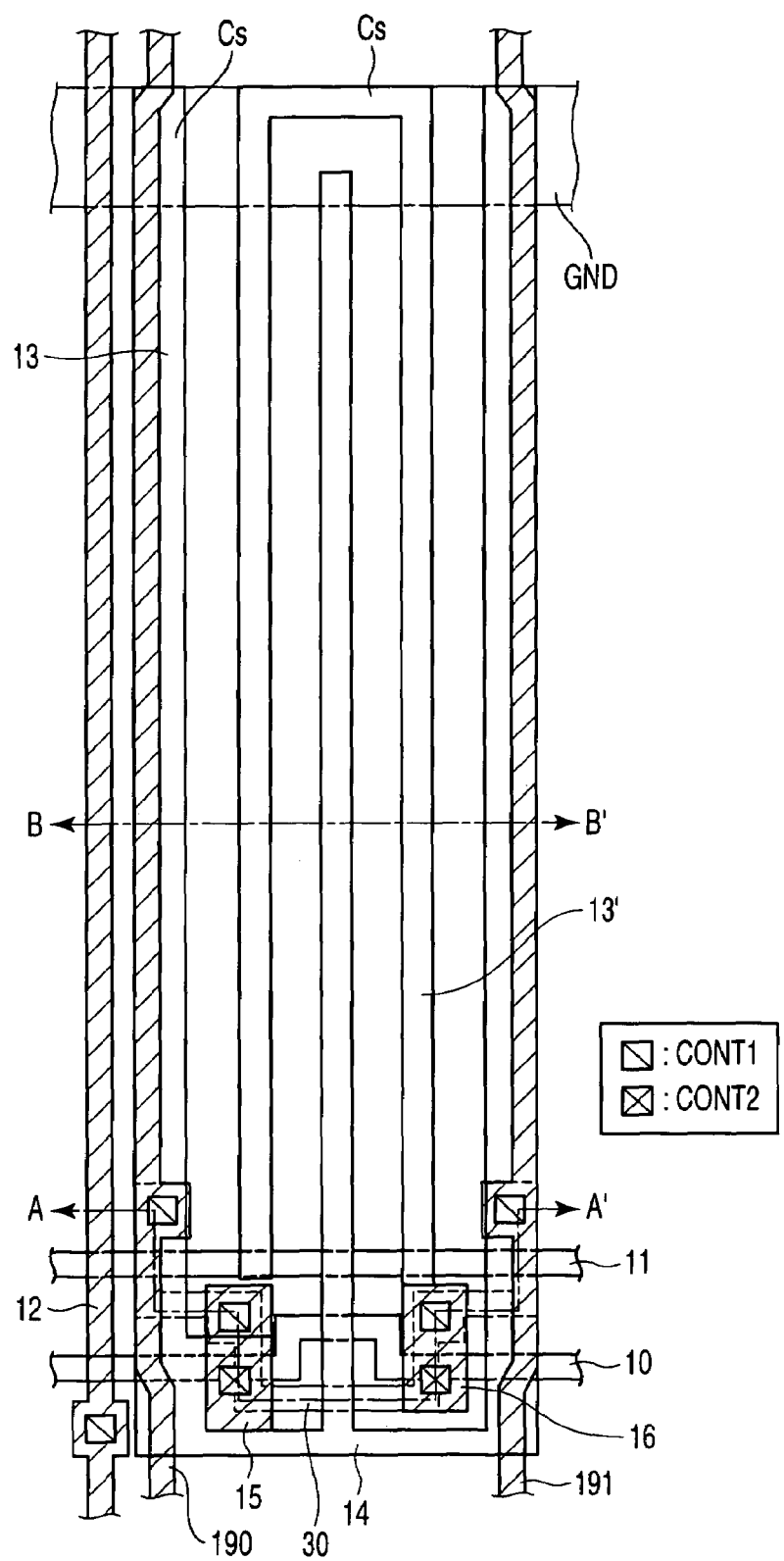
FIG. 8 shows the plan-view structure of the pixel circuit shown in FIG. 3.
Figure 9:
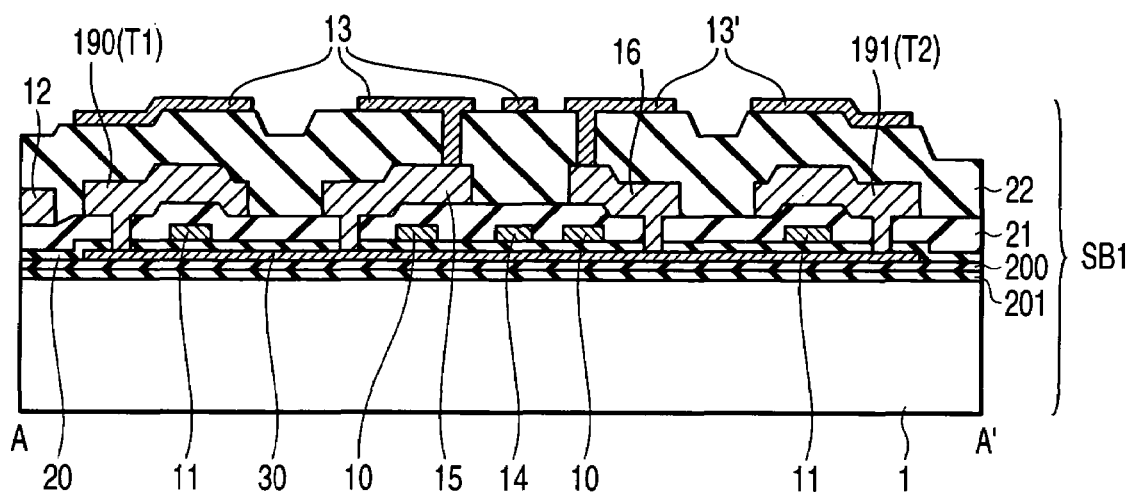
FIG. 9 shows the cross-sectional structure of the pixel circuit, taken along line A-A' in FIG. 8.
Figure 10:
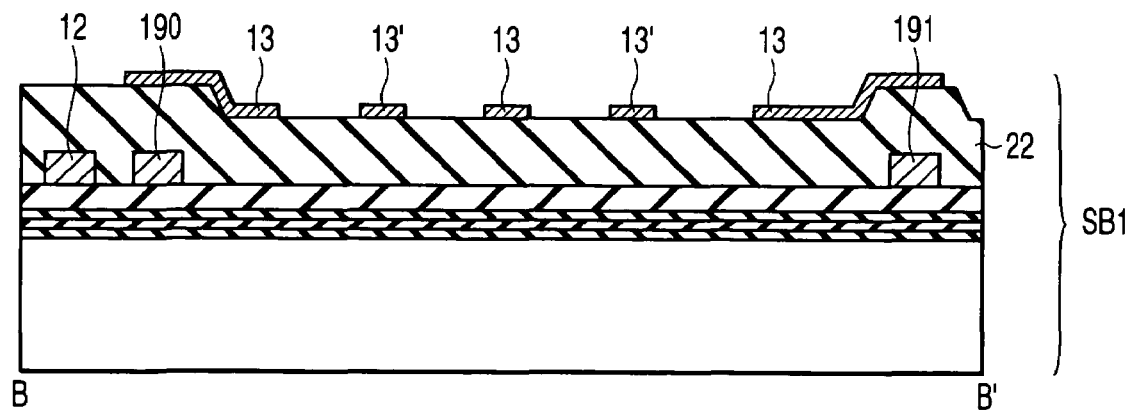
FIG. 10 shows the cross-sectional structure of the pixel circuit, taken along line B-B' in FIG. 8.

FIG. 8 shows the plan-view structure of the pixel circuit PX shown in FIG. 3. FIG. 9 and FIG. 10 show the cross-sectional structures of the pixel circuit PX, taken along line A-A' and B-B' in FIG. 8. The pixel circuit PX is disposed in a pixel area that is defined between two adjacent scan lines 10 and common electrodes GND in the vertical direction that corresponds to the column direction, and between two adjacent video signal lines 12 and first and second power lines 190 and 191 in the horizontal direction that corresponds to the row direction. The pixel area has a pitch of 74 µm in the horizontal direction and a pitch of 222 µm in the vertical direction. The pixel electrodes 13 and 13', transistors N1 to N5, precharge control lines 11 and first and second storage capacitances Cs are laid out in the pixel area, as shown in FIG. 8.

A gate 14 of the transistor N1 is directly connected to the video signal line 12 via a contact through-hole CONT1. A channel region of the transistor N1 is defined at an intersection between the gate 14 and a single-crystal silicon film 30. Channel regions of the transistors N2 and N3 are defined at intersections between the single-crystal silicon film 30 and scan line 10. Channel regions of the transistors N4 and N5 are defined at intersections between the single-crystal film 30 and precharge control line 11. The drains of the transistors N4 and N5 are connected to the power lines 190 and 191, respectively, via contact through-holes CONT1. The sources of the transistors N2 and N3 are connected to connection electrodes 15 and 16 via contact through-holes CONT1. The connection electrodes 15 and 16 are connected to the pixel electrodes 13 and 13', respectively, via contact through-holes CONT2. The pixel electrodes 13 and 13' are formed of comb-shaped transparent electrodes, which have a width of 3 µm and are disposed in an intermeshing fashion. The gap between the electrodes is 7 µm. The pixel electrodes 13 and 13' are formed so as to overlap the power lines 190 and 191, with the protection insulation film 22 interposed therebetween. The pixel electrodes 13 and 13' are capacitive-coupled to the common electrode GND, thereby constituting first and second storage capacitances Cs that retain the potentials of the pixel electrodes 13 and 13' for a predetermined time period. Each of the transistors N1 to N5 is composed of an NMOS transistor having a channel width of 3 µm and a channel length of 3 µm.

In the support substrate SB1, the glass substrate 1 is formed of non-alkali glass with the strain point of about 670° C. An $SiN_x$ film 201 with a thickness of 50 nm and an $SiO_2$ film 200 with a thickness of 100 nm are formed on the glass substrate 1 as buffer insulation films. The buffer insulation films function to prevent diffusion of impurities, such as Na, from the glass substrate 1.

The transistors N1 to N5 and common electrode line GND are formed by using the single-crystal film 30 with a thickness of 200 nm, which is formed on the $SiO_2$ film 200 and is divided into a plurality of parts by patterning. In the single-crystal silicon film 30 of the transistors N1 to N5, there are provided channel regions that are located under the gates and $n^+$ source regions and drain regions that are disposed on both sides of the channel regions. The single-crystal silicon film 30 is covered with a gate insulation film 20 that is formed of $SiO_2$ with a thickness of 30 nm. The scan lines 10 of tungsten (W), precharge control lines 11 and the gate electrode 14 of transistor N1 are formed on the gate insulation film 20. The common electrode GND, like the scan line 10, is formed of tungsten (not shown). An interlayer insulation film 21 of $SiO_2$ is formed so as to cover the surface of the resultant structure. Power lines 190 and 191, which are formed of three-layer metal films of Mo/Al/Mo, are connected to the drains of the transistors N4 and N5 via contact through-holes CONT1 that are formed in the interlayer insulation film 21. In addition, connection electrodes 15 and 16, which are formed of three-layer metal films of Mo/Al/Mo, are connected to the sources of the transistors N2 and N3 via the contact through-holes that are formed in the interlayer insulation film 21. A protection insulation film 22 of $SiN_x$ is formed so as to cover the surface of the resultant structure. The other ends of the connection electrodes 15 and 16 are connected to the pixel electrodes 13 and 13' via contact through-holes CONT2 that are formed in the protection insulation film 22.

Next, specific fabrication steps of the above liquid crystal display are described.

A non-altali glass substrate 1 having a thickness of 500 µm, a width of 750 mm, a length of 950 mm and a strain point of 670° C. is washed. An $SiN_x$ film 201 with a thickness of 50 nm is formed on the glass substrate 1 by plasma CVD using a mixture gas of $SiH_4$, $NH_3$ and $N_2$. Subsequently, an $SiO_2$ film 200 with a thickness of 100 nm is formed by plasma CVD using a mixture gas of $SiH_4$, $N_2O$ and He.

Then, a substantially intrinsic hydrogenated amorphous silicon film with a thickness of 200 nm is formed by plasma CVD using a mixture gas of $SiH_4$ and Ar. The temperature for film formation is 400° C., and the amount of hydrogen immediately after the film formation is about 5 atoms %. Next, the substrate is annealed at 450° C. for about 30 minutes, thereby releasing hydrogen contained in the hydrogenated amorphous silicon film.

Subsequently, a cap SiON film with a thickness of 300 nm is formed by plasma CVD using a mixture gas of $SiH_4$, $NH_3$ and $O_2$ These plasma CVD and anneal steps are continuously performed in a vacuum, without exposing the substrate to atmospheric air.

With application of a pulse excimer laser beam having a wavelength of 308 nm, the amorphous silicon film is melted and recrystallized, thereby forming a silicon film 30 that is partly single-crystallized. At this time, in order to obtain a single-crystal region having a largest possible area, the following method was adopted. That is, using a phase shift mask with a proper pattern, the excimer laser beam was caused to have a spatial distribution in laser beam intensity at the surface of the substrate and to have a temperature gradient in the horizontal direction. Thereby, horizontal crystal growth was facilitated and an array of rectangular single-crystal regions each having one side of about 4 μm was obtained.

In a subsequent step, the cap SiON film is removed by buffer hydrofluoric acid, and the silicon film 30 is processed to have a predetermined pattern by an ordinary photolithographic method.

An oxide film with a thickness of 4 nm is formed on the surface of the silicon film 30 by plasma oxidation in a mixture gas of Kr and $O_2$. Then, an $SiO_2$ film with a thickness of 24 nm is formed by plasma CVD using a mixture gas of tetraethoxysilane (TEOS) and $O_2$. Thus, a two-layer-stacked gate oxide film is obtained.

Next, boron (B+) is ion-implanted with an acceleration voltage of 20 KeV and a dose of $1 \times 10^{11}$ $cm^{-2}$. The boron serves to adjust the threshold voltage of the TFT.

Using a sputtering method, a tungsten film with a thickness of 250 nm is formed. Then, using an ordinary photolithographic method, a predetermined resist pattern is formed on the tungsten (W) film. The W film is processed to have a predetermined shape by reactive ion etching (RIE) using $CF_4$. Thus, scan lines are obtained. In the state in which the resist pattern used for etching is left, phosphorous (P) ions are ion-implanted with an acceleration voltage of 40 KeV and a dose of $1 \times 10^{15}$ $cm^{-2}$. Thus, source and drain regions of the N-channel thin-film transistors are formed.

Subsequently, with the resist pattern being left, the substrate is processed using a mixed acid. The processed Mo electrode is subjected to side etching and the pattern is slimmed. After the resist is removed, P ions are ion-implanted with an acceleration voltage of 40 KeV and a dose of $1 \times 10^{13}$ $cm^{-2}$. Thus, a lightly doped drain (LDD) region is formed. The length of the LDD region is controlled by the time of the side etching using the mixed acid.

After the photoresist is removed, the implanted impurities are activated by rapid thermal anneal (RTA) by applying ultraviolet light of an excimer lamp or a metal halide lamp to the substrate.

Next, an $SiO_2$ film with a thickness of 500 nm is formed as an interlayer insulation film 21 by plasma CVD using a mixture gas of tetraethoxysilane and oxygen. After a predetermined resist pattern is formed, dry etching is performed using $CHF_3$, thus forming contact through-holes in the interlayer insulation film 21. Then, using a sputtering method, Ti with a thickness of 50 nm, Al—Si—Cu alloy with a thickness of 500 nm and Ti with a thickness of 50 nm are successively stacked. After forming a predetermined resist pattern, these are etched as a batch by reactive ion etching (RIE) using a mixture gas of $BCl_3$ and $Cl_2$. Thus, video signal lines 12, connection electrodes, liquid crystal drive power lines 190 and 191, etc. are obtained.

An $Si_3N_4$ film with a thickness of 400 nm is formed as a protection insulation film 22 by plasma CVD using a mixture gas of $SiH_4$, $NH_3$ and $N_2$. After a predetermined photoresist pattern is formed, contact through-holes are formed in the protection insulation film 22 by dry etching using $SF_6$.

Then, an ITO (Indium Tin Oxide) film with a thickness of 70 nm is formed by sputtering and is processed to have a predetermined shape by wet etching using a mixed acid so as to obtain first and second pixel electrodes 13 and 13'.

Subsequently, a liquid crystal layer, etc. are formed by conventional fabrication steps.

In the above example of fabrication, the single-crystal silicon film is used as a semiconductor layer of the thin-film transistor. Thus, non-uniformity in threshold voltage between a plurality of thin-film transistors, which are formed in the substrate, can sufficiently be reduced, and uniform image display is realized.

In this example, the single-crystal silicon film is used as a semiconductor layer, but polysilicon or amorphous silicon may be used as the material of the semiconductor layer, thereby to form the thin-film transistor.

According to the above-described manufacturing method, upon application of liquid crystal drive voltage from the pixel electrodes 13 and 13', a lateral electric field, which is substantially parallel to the plane of these electrodes, i.e. the surface of the substrate, is created in the liquid crystal layer 506. At this time, liquid crystal molecules are rotated in the plane of the substrate to control the polarization direction of transmission light. Specifically, since an image can be displayed without raising the liquid crystal molecules relative to the plane of the substrate, the viewing direction dependency of contrast due to birefringence of liquid crystal molecules can substantially be eliminated, and a high-image-quality liquid crystal display with a wide viewing angle can be obtained.

Figure 11:
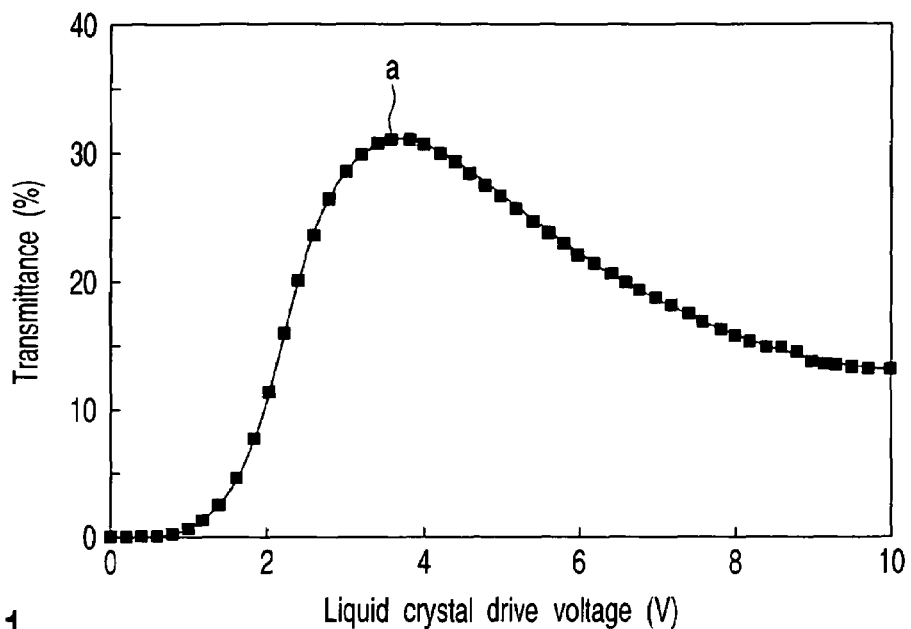
FIG. 11 is a graph showing the voltage-luminance characteristic of the liquid crystal display shown in FIG. 1.

FIG. 11 shows the voltage-luminance characteristic of this liquid crystal display. Specifically, the transmittance of the liquid crystal layer 506 is indicated relative to the liquid crystal drive voltage that is applied to the pixel electrodes 13 and 13'. In this case, a nematic liquid crystal, which has a dielectric anisotropy $\Delta\in$ that is a positive value of 7, and a refractive anisotropy $\Delta n$ of 0.073, was used as a liquid crystal composition of the liquid crystal layer 506. In this embodiment, the liquid crystal with the positive dielectric anisotropy $\Delta\in$ was used, but a liquid crystal with a negative dielectric anisotropy $\Delta\in$ may be used. The alignment films ORI1 and ORI2 are subjected to rubbing treatment in substantially parallel directions such that a pre-tilt angle of 1° may be set. A gap d between the support substrates SB1 and SB2 is set at 4.5 μm by dispersing spherical polymer beads in the liquid crystal layer 506. As regards two polarizer plates 505, the polarized-light transmission axis of one of the polarizer plates 505 is set at 85°, which is substantially parallel to the rubbing direction. The polarized-light transmission axis of the other polarizer plates 505 is set at −5 which is perpendicular to the polarized-light transmission axis of the aforementioned one polarizer plates 505. Thus, a liquid crystal display with the normally close characteristic was obtained.

In this embodiment, each time the relationship in potential between the power lines 190 and 191 is reversed at given cycles, the potential difference obtained between the pixel electrodes 13 and 13' is retained in the liquid crystal capacitance CLC as the liquid crystal drive voltage VLC. Thus, the liquid crystal drive voltage VLC whose polarity is reversed regardless of that of the video signal voltage Vs can be continuously applied to the liquid crystal layer 506, so as to maintain a normal display operation without non-uniform distribution of liquid crystal molecules.

In addition, it should suffice if the driver LSI of the horizontal drive circuit HDRV merely outputs a unipolar video signal voltage Vs to each video signal line 12. Thus, the maximum value thereof is substantially restricted only by the maximum output voltage of the power supply circuit PW. Moreover, since the liquid crystal drive voltage VLC is about double the video signal voltage Vs, the amplitude of the video signal voltage Vs can be decreased to about half the amplitude in the prior art. Unlike the prior art, there is no need to configure the driver LSI of the horizontal drive circuit HDRV so as to be able to output both positive and negative analog voltages. Hence, the driver LSI can be manufactured by an ordinary low-withstand-voltage CMOS process to reduce the manufacturing cost thereof. Further, the decreased amplitude in virtue of the unipolar video signal voltage Vs contributes toward reducing the power consumption of the driver LSI and also reducing a crosstalk voltage caused by a parasitic capacitance present between the video signal line and the pixel electrode. In this case, vertical shadowing of an image, which is generally called "vertical smear," is reduced. Thus, the enhancement in image quality is expectable.

Second Embodiment

A transmission-type active matrix liquid crystal display according to a second embodiment of the present invention will now be described. FIG. 12 schematically shows an equivalent circuit of the liquid crystal display, and FIG. 13 shows an equivalent circuit of one of pixel circuits PX that are arrayed in a matrix in the liquid crystal display shown in FIG. 12.

This liquid crystal display is substantially the same as the liquid crystal display of the first embodiment, except for the electrode structure that is provided to drive a liquid crystal by electric fields created between the pixel electrode 13 and common electrode GND and between the pixel electrode 13' and common electrode GND. In FIG. 12 and FIG. 13, the parts similar to those in the first embodiment are denoted by the same reference numerals, and a detailed description thereof is omitted.

Each pixel circuit PX includes first and second power terminals T1 and T2, first and second pixel electrodes 13 and 13', and first to fifth transistors N1, N2, N3, N4 and N5. The transistors N1 to N5 are all N-channel thin-film transistors (TFTs). The pixel electrodes 13 and 13' are connected to the sources of the transistors N4 and N5 and are capacitive-coupled to the common electrode GND so as to constitute a liquid crystal capacitance CLC. The transistor N1 has a gate connected to the video signal line 12, a drain connected to a drain of the transistor N2, and a source connected to a drain of the transistor N3. The transistors N2 and N3 have gates connected to the scan line 10, and the transistors N4 and N5 have gates connected to the precharge control line 11 that extends in parallel to the scan line 10. The transistors N4 and N5 have drains connected to the power terminals T1 and T2 of power lines 190 and 191, respectively. The power lines 190 and 191 are connected to a power supply circuit PW, and are set at one and the other of a positive power source potential and a negative power source potential. The power lines 190 and 191 are driven by switches provided in the power supply circuit PW such that the relationship in potential between the power lines 190 and 191 is reversed in predetermined cycles.

Figure 13:
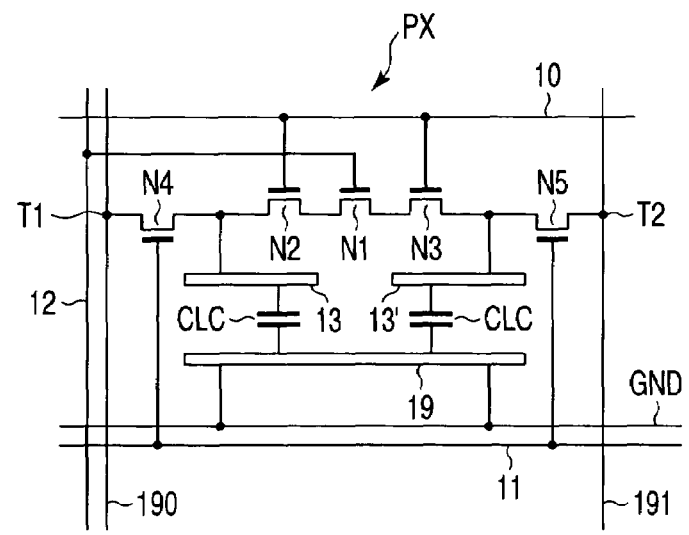
FIG. 13 shows an equivalent circuit of one of pixel circuits that are arrayed in a matrix in the liquid crystal display shown in FIG. 12.
Figure 15:
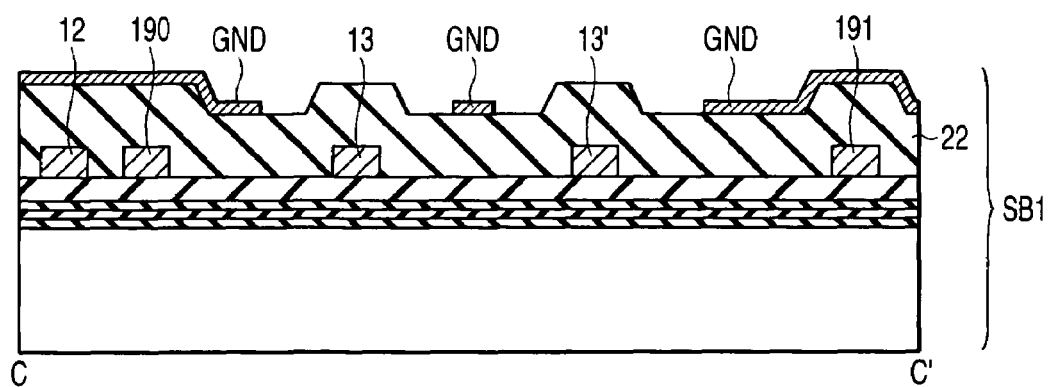
FIG. 15 shows the cross-sectional structure of the pixel circuit, taken along line C-C' in FIG. 14.
Figure 14:
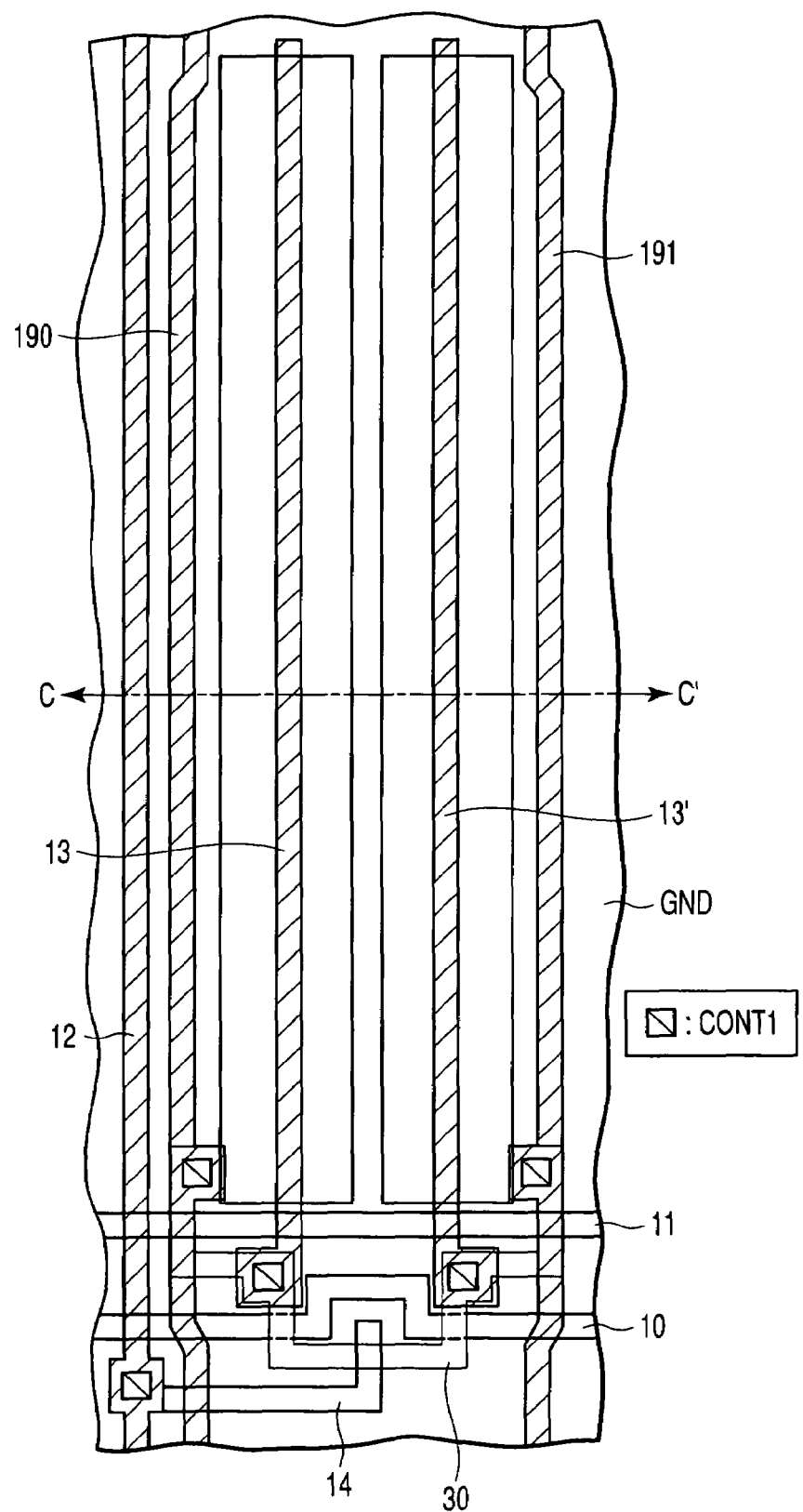
FIG. 14 shows the plan-view structure of the pixel circuit shown in FIG. 13.

FIG. 14 shows the plan-view structure of the pixel circuit PX shown in FIG. 13. FIG. 15 shows the cross-sectional structure of the pixel circuit PX, taken along line C-C' in FIG. 14. The pixel electrodes 13 and 13' are formed of the same wiring layer as the power lines 190 and 191 and are formed of straight electrodes that extend substantially in parallel to the power lines 190 and 191. On the other hand, the common electrode GND is formed of a transparent electrode that is provided on the protection insulation layer 22, and insulated from the pixel electrodes 13 and 13' by the protection insulation layer 22. The common electrode GND is formed so as to cover almost the entire display region, and has a structure in which openings are provided only at light transmission parts in the respective pixel areas. The liquid crystal layer 506 is driven by electric fields that are substantially horizontal to the plane of the substrate and are created between the pixel electrode 13 and the opening end part of the common electrode GND and between the pixel electrode 13' and the opening end part of the common electrode GND.

According to the present embodiment, the direction of the electric field that is created between one pixel electrode 13 and the common electrode GND is set to be opposite to the direction of the electric field that is created between the other pixel electrode 13' and the common electrode GND. In short, two regions with different voltage polarities can be provided in one pixel area. In the prior art, in the frame reverse driving in which the polarity of the liquid crystal drive voltage is reversed on a frame-by-frame basis, a problem of flicker of images arises due to asymmetry between the voltage-luminance characteristic obtained by applying the liquid crystal drive voltage of a positive polarity to the liquid crystal layer 506, and the voltage-luminance characteristic obtained by applying the liquid crystal drive voltage of a negative polarity to the liquid crystal layer 506. By contrast, in the present embodiment, regions with different voltage polarities are provided in a single pixel area. Thereby, the alignment directions of liquid crystal molecules are averaged within the pixel area. Hence, no asymmetry occurs between the voltage-luminance characteristic obtained by applying the liquid crystal drive voltage of a positive polarity and the voltage-luminance characteristic obtained by applying the liquid crystal drive voltage of a negative polarity. Therefore, even where the frame reverse driving method is adopted, occurrence of flicker can be prevented.

Third Embodiment

Figure 16:
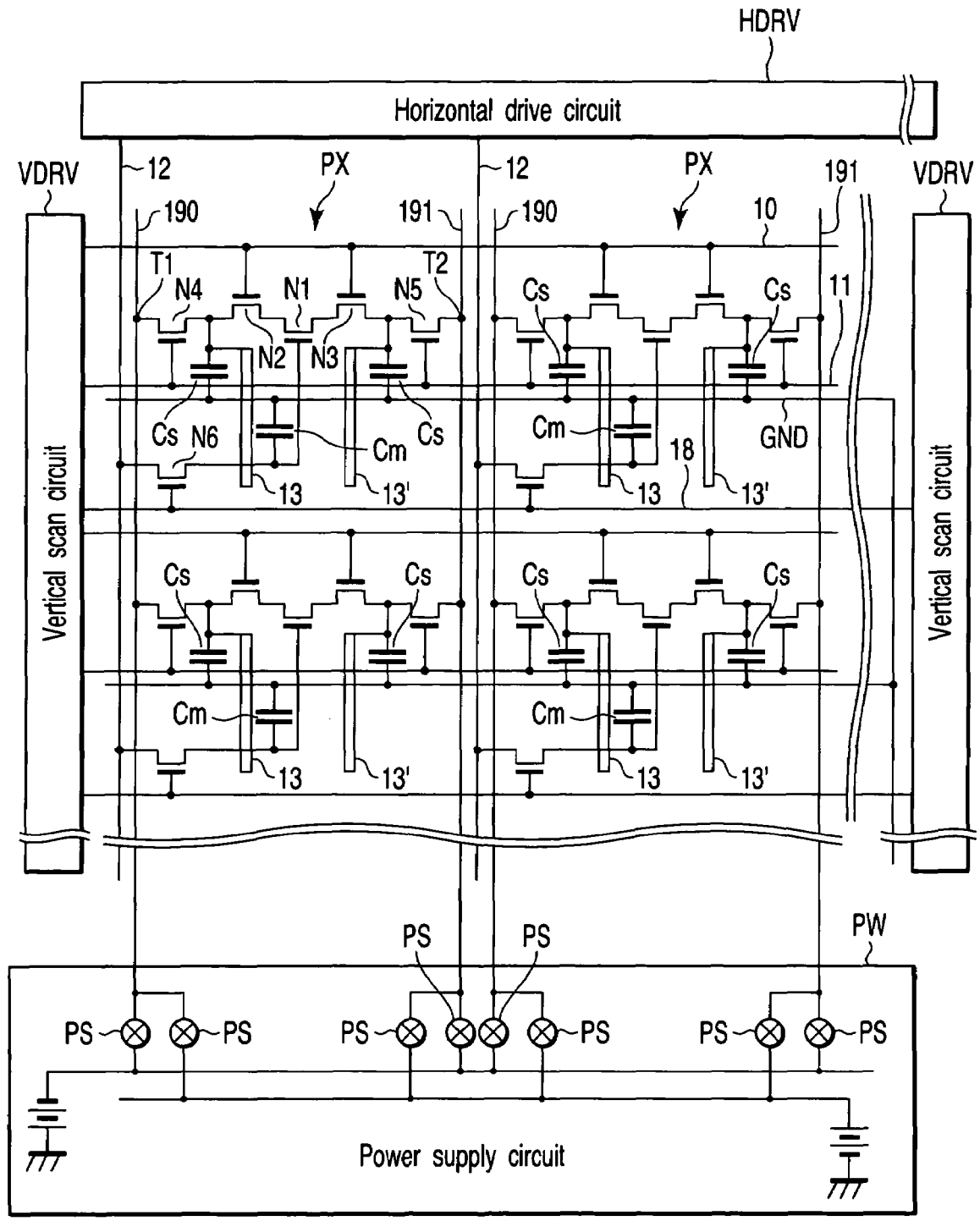
FIG. 16 schematically shows the plan-view structure of a transmission-type active matrix liquid crystal display according to a third embodiment of the present invention.

A transmission-type active matrix liquid crystal display according to a third embodiment of the present invention will now be described. FIG. 16 schematically shows the plan-view structure of the liquid crystal display, and FIG. 17 shows an equivalent circuit of one of pixel circuits PX that are arrayed in a matrix in the liquid crystal display shown in FIG. 16.

This liquid crystal display is substantially the same as the liquid crystal display of the first embodiment, except for the circuit structure that is provided to make the refresh cycle of the video signal voltage Vs different from the polarity reversing cycle of the liquid crystal drive voltage VLC. In FIG. 16 and FIG. 17, the parts similar to those in the first embodiment are denoted by the same reference numerals, and a detailed description thereof is omitted.

As is shown in FIG. 16, in this liquid crystal device, a vertical scan circuit VDRV2 is provided in addition to the vertical scan circuit VDRV. The vertical scan circuit VDRV2 is connected to a plurality of second scan lines 18 that are arranged along the rows of pixel circuits PX. The vertical scan circuit VDRV2 supplies a select pulse voltage Vscan to one of the second scan lines 18 in each horizontal scan period. Each pixel circuit PX additionally includes a sample and hold circuit that is provided between the video signal line 12 and the gate of the transistor N1. The sample and hold circuit includes a sixth transistor N6 and a capacitance element Cm. The transistor N6 samples a video signal voltage Vs from the video signal line 12, and the capacitance element Cm holds the video signal voltage Vs sampled by the transistor N6, and continuously outputs the video signal voltage Vs to the gate of the transistor N1. In this case, the transistor N1 is set at a conductance corresponding to the video signal voltage Vs output from the capacitance element Cm.

Figure 17:
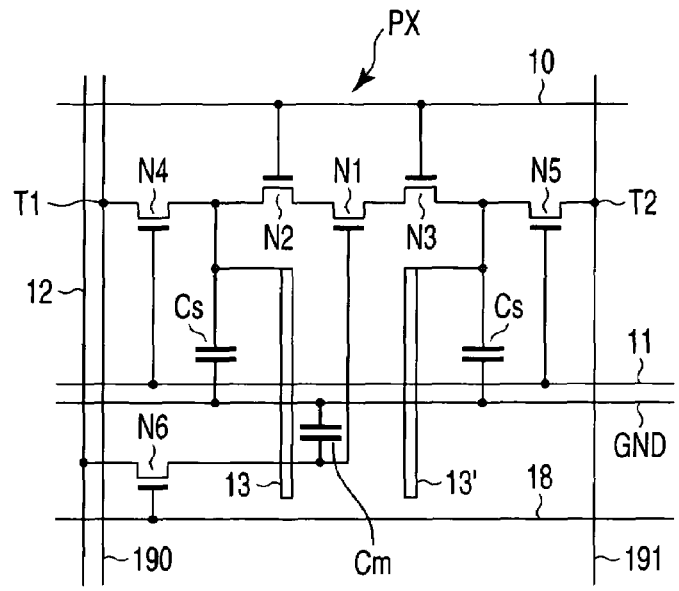
FIG. 17 shows an equivalent circuit of one of pixel circuits that are arrayed in a matrix in the liquid crystal display shown in FIG. 16.
Figure 19:
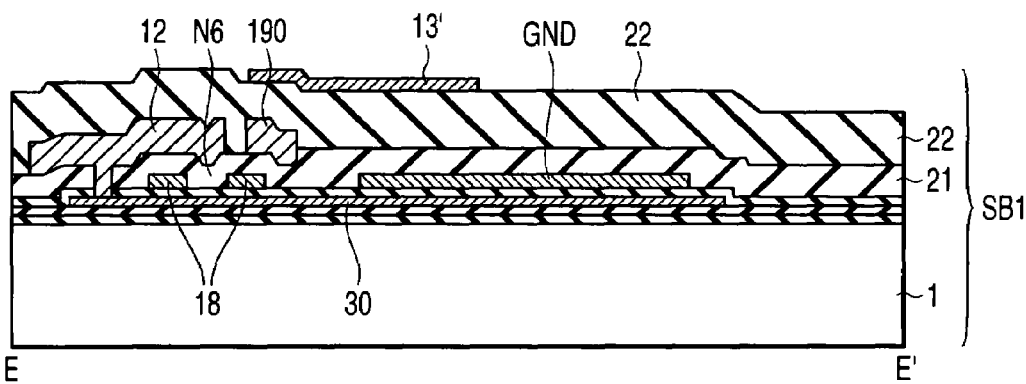
FIG. 19 shows the cross-sectional structure of the pixel circuit, taken along line E-E' in FIG. 18.
Figure 18:
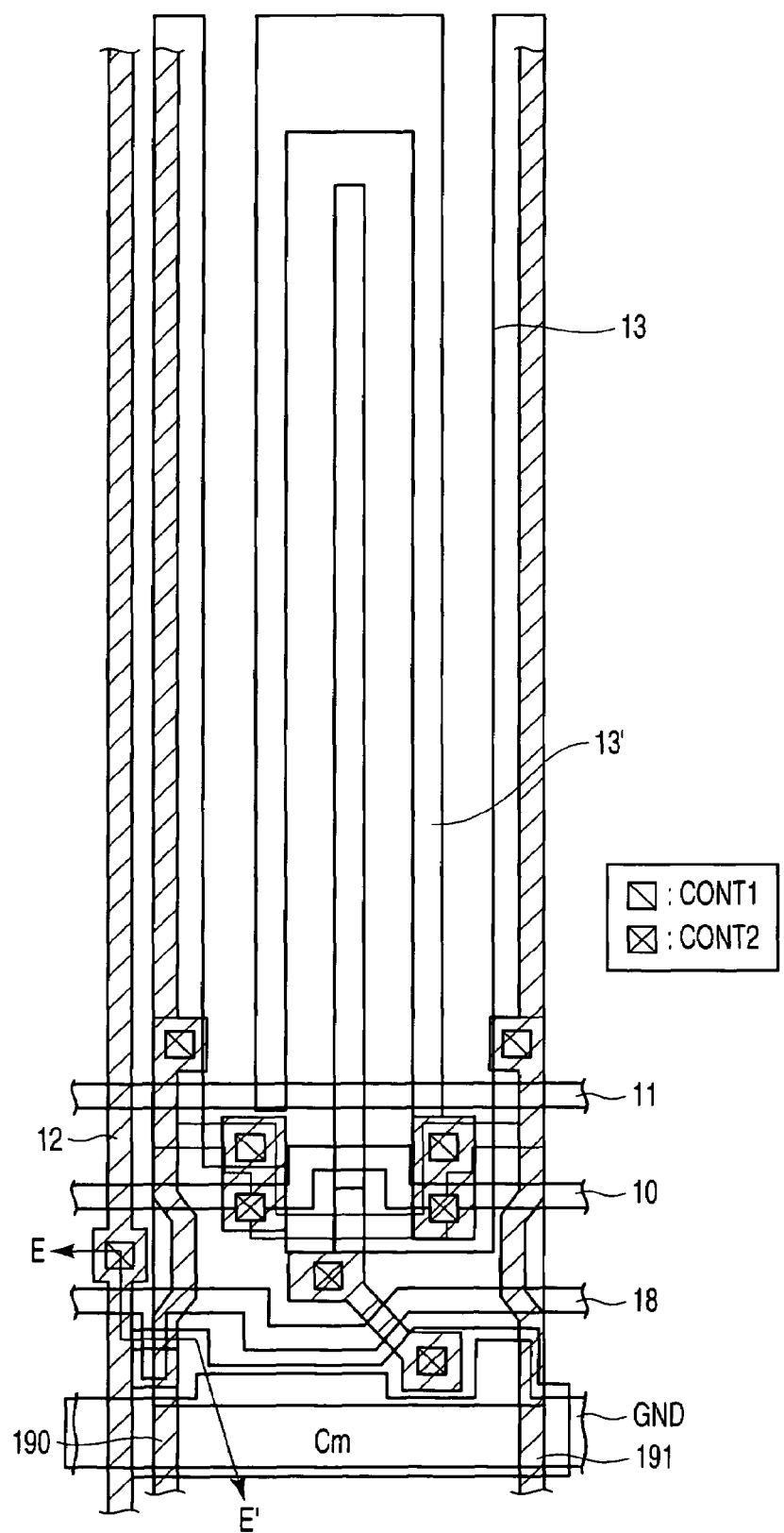
FIG. 18 shows the plan-view structure of the pixel circuit shown in FIG. 17.

FIG. 18 shows the plan-view structure of the pixel circuit PX shown in FIG. 17. FIG. 19 shows the cross-sectional structure of the pixel circuit PX, taken along line E-E' in FIG. 18.

The pixel circuit PX is disposed in a pixel area surrounded by two adjacent common electrodes GND, a video signal line 12 and power lines 190 and 191 that extend in parallel to the video signal line. In this pixel area, transistors N1 to N5 and a precharge control line 11 are disposed. The drain of the transistor N6 is connected to the video signal line 12 via a contact through-hole CONT1. The channel region of the transistor is defined at an intersection between the scan line 18 and the silicon film 30. The gate electrode 14 of the transistor N1 is connected to the source of the transistor N6 via a contact through-hole CONT1. The capacitance element Cm is formed of an overlapping part between the common electrode GND and the source of the transistor N6. The channel region of the transistor N1 is defined at an intersection between the gate 14 and single-crystal silicon film 30. The channel regions of the transistors N2 and N3 are defined at intersections between the single-crystal silicon film 30 and scan line 10. The channel regions of the transistors N4 and N5 are defined at intersections between the single-crystal silicon film 30 and precharge control line 11. The drains of the transistors N4 and N5 are connected to the power lines 190 and 191 via contact through-holes CONT1. The sources of the transistors N2 and N3 are connected to connection electrodes 15 and 16 via contact through-holes CONT1. The connection electrodes 15 and 16 are connected to the pixel electrodes 13 and 13' via contact through-holes CONT2. The pixel electrodes 13 and 13' are formed of comb-shaped transparent electrodes, which have a width of 3 μm and are disposed in an intermeshing fashion. The gap between the electrodes is 7 μm. The pixel electrodes 13 and 13' are configured so as to overlap the power lines 190 and 191, with the protection insulation film 22 interposed therebetween.

Figure 21:
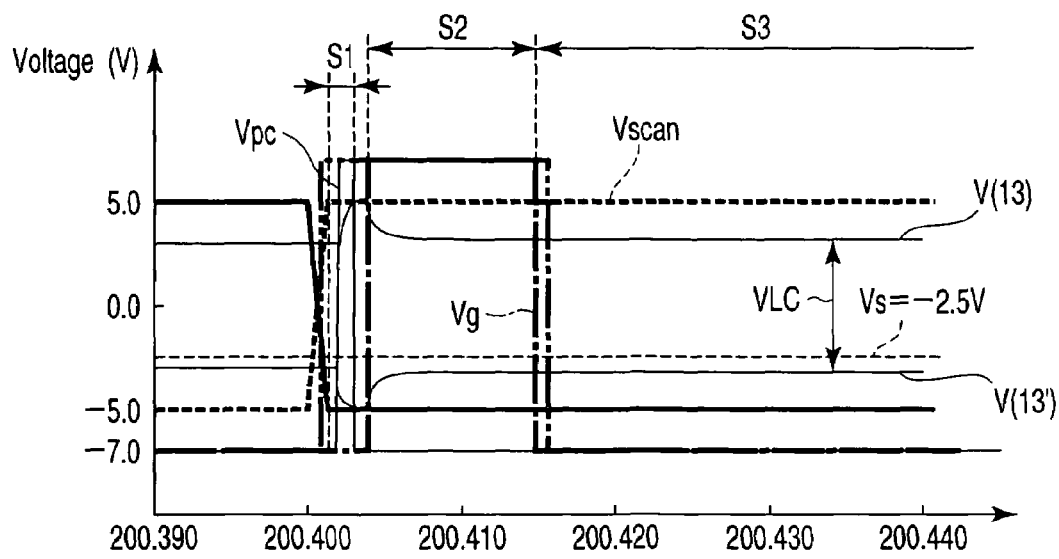
FIG. 21 is a time chart showing the voltage waveforms of the pixel circuit of FIG. 17 in one frame period.
Figure 20:
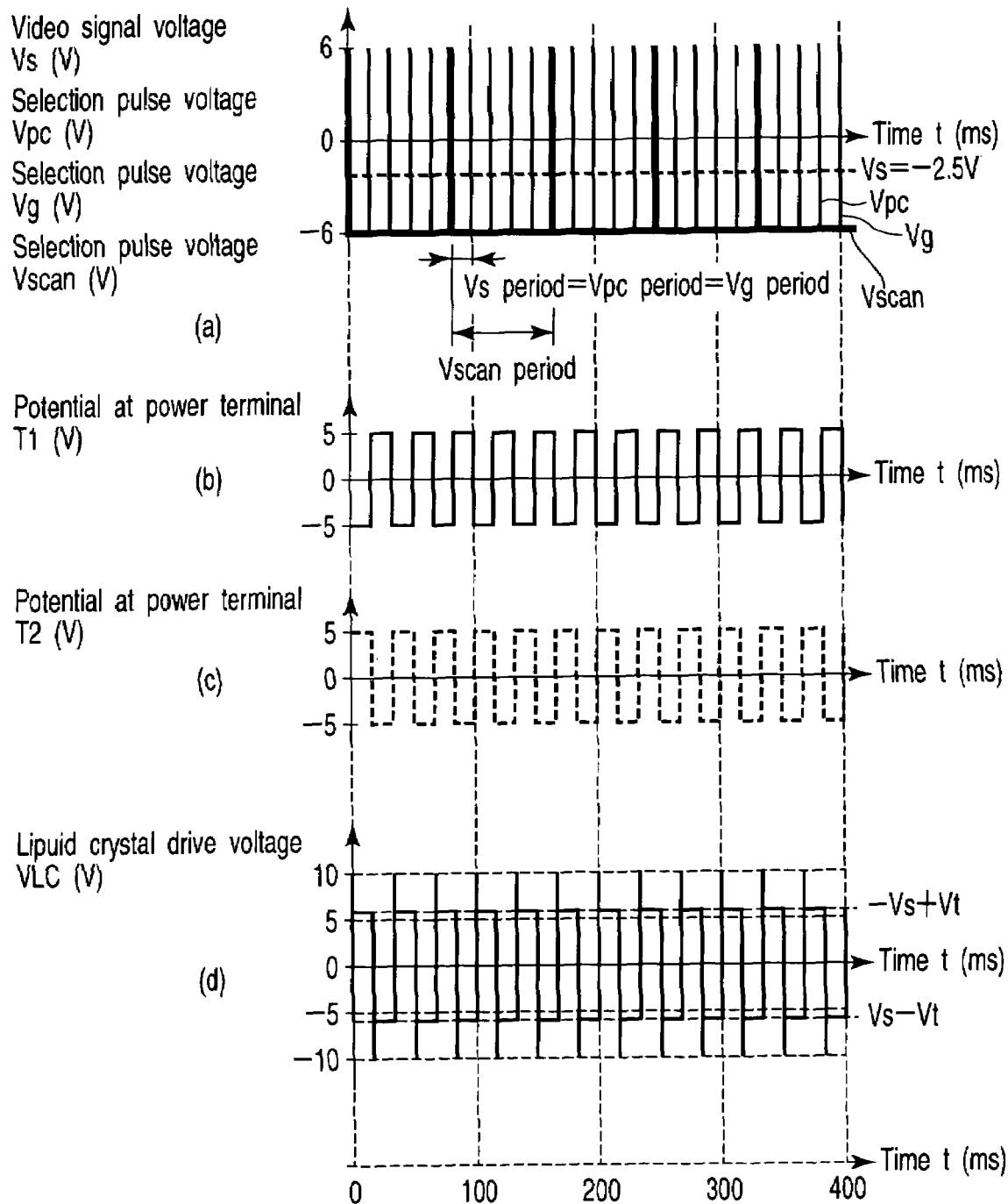
FIG. 20 is a time chart showing the voltage waveforms of the pixel circuit of FIG. 17 in a plurality of frame periods.

The operation of the pixel circuit PX is described in detail. FIG. 20 illustrates the voltage waveforms of the pixel circuit PX in a plurality of frame periods. FIG. 21 illustrates the voltage waveforms of the pixel circuit PX in one frame period. In FIG. 21, the voltage waveforms are depicted in an overlapping fashion in order to clarify the transition timing thereof. As is shown in FIG. 21, the operation of the pixel circuit PX comprises three steps: a precharge step S1, a video write step S2 and a video retention step S3. This is the same as in the first embodiment.

In this liquid crystal display, the transistor N6 and capacitance element Cm are additionally provided in the pixel circuit PX so as to make it possible to independently set the polarity reversing cycle of the liquid crystal drive voltage and the refresh cycle of the video signal voltage Vs. Rectangular-waveform AC voltages, which are phase-shifted by 180° as shown in parts (b) and (c) of FIG. 20, are applied to the power lines 190 and 191.

In the precharge step S1, the transistors N4 and N5 are turned on upon rising of the select pulse voltage Vpc that is supplied via the precharge control line 11. Thus, the transistors N4 and N5 precharge the pixel electrodes 13 and 13' at potentials +VDD and −VDD, which are set at the power terminals T1 and T2 via the power lines 190 and 191.

In the video write step S2, the transistors N4 and N5 are turned off upon falling of the select pulse voltage Vpc. When a video signal voltage Vs with a negative value is supplied to the video signal line 12 from the horizontal drive circuit HDRV, the video signal voltage Vs is further supplied from the video signal line 12 to the transistor N6. In this state, the transistor N6 is turned on upon rising of the select pulse voltage Vscan that is supplied from the vertical scan circuit VDRV2 to the second scan line 18 of the selected row. The transistor N6 thus samples the video signal voltage Vs. The capacitance element Cm holds the video signal voltage Vs, which is sampled by the transistor N6, and supplies the video signal voltage Vs to the gate of the transistor N1. While the video signal voltage Vs is being supplied to the gate of the transistor N1, the transistors N2 and N3 are turned on upon rising of the select pulse voltage Vg that is supplied via the scan line 10 of the selected row. The transistors N2 and N3 thus connect the pixel electrodes 13 and 13' to one end and the other end of the current path of the transistor N1. Since the transistor N1 is set at a fixed channel conductance corresponding to the video signal voltage Vs, this causes canceling of the charges that are retained in the pixel electrodes 13 and 13' with opposite polarities. As a result, the potential difference between the pixel electrodes 13 and 13', that is, the liquid crystal drive voltage VLC, converges to a fixed value of 2·(−Vs+Vt).

In the video retention step S3, the select pulse voltage Vg falls after the convergence of the liquid crystal drive voltage VLC, and turns off the transistors N2 and N3. In this state, even if the gate voltage of the transistor N1 varies, the potentials V(13) and V(13') of the pixel electrodes 13 and 13' do not vary. Furthermore, the select pulse voltage Vscan falls to turn off the transistor N6. Thereby, even if the capacitance element Cm is electrically disconnected from the video signal line 12, the capacitance element Cm continuously holds the video signal voltage Vs.

In this state, the precharge step S1, video write step S2 and video retention step S3 can be executed by reversing the relationship in voltage between the power lines 190 and 191, without sampling the video signal voltage Vs by the transistor N6. Specifically, redistribution of charge is executed in accordance with the video signal voltage Vs that is continuously applied to the gate of the transistor N1 from the capacitance element Cm, and the polarity of the liquid crystal drive voltage VLC is reversed. In this case, there is no need to supply the select pulse voltage Vscan from the scan line 18 and the video signal voltage Vs from the video signal line 12. Since it should suffice if the video signal voltage Vs is supplied when the image is to be changed, the refresh cycle of the video signal voltage Vs can be made longer than the polarity reversing cycle of the liquid crystal drive voltage VLC. Part (a) of FIG. 20 shows an example in which the cycle of the select pulse voltage Vscan is set at 83.5 ms. As is clear from part (d) of FIG. 20, the liquid crystal layer 506 is properly AC-driven with the structure of the present embodiment.

In the present embodiment, if the refresh cycle of the video signal voltage Vs is set to be longer than the polarity reversing cycle of the liquid crystal drive voltage VLC, it is possible to suspend the driving operations of the driver LSIs of the vertical scan circuit VDRV and horizontal scan circuit HDRV during the time period in which the refresh of the video signal voltage Vs is needless. Therefore, the power consumption of the driver LSI can greatly be reduced.

Fourth Embodiment

Figure 22:
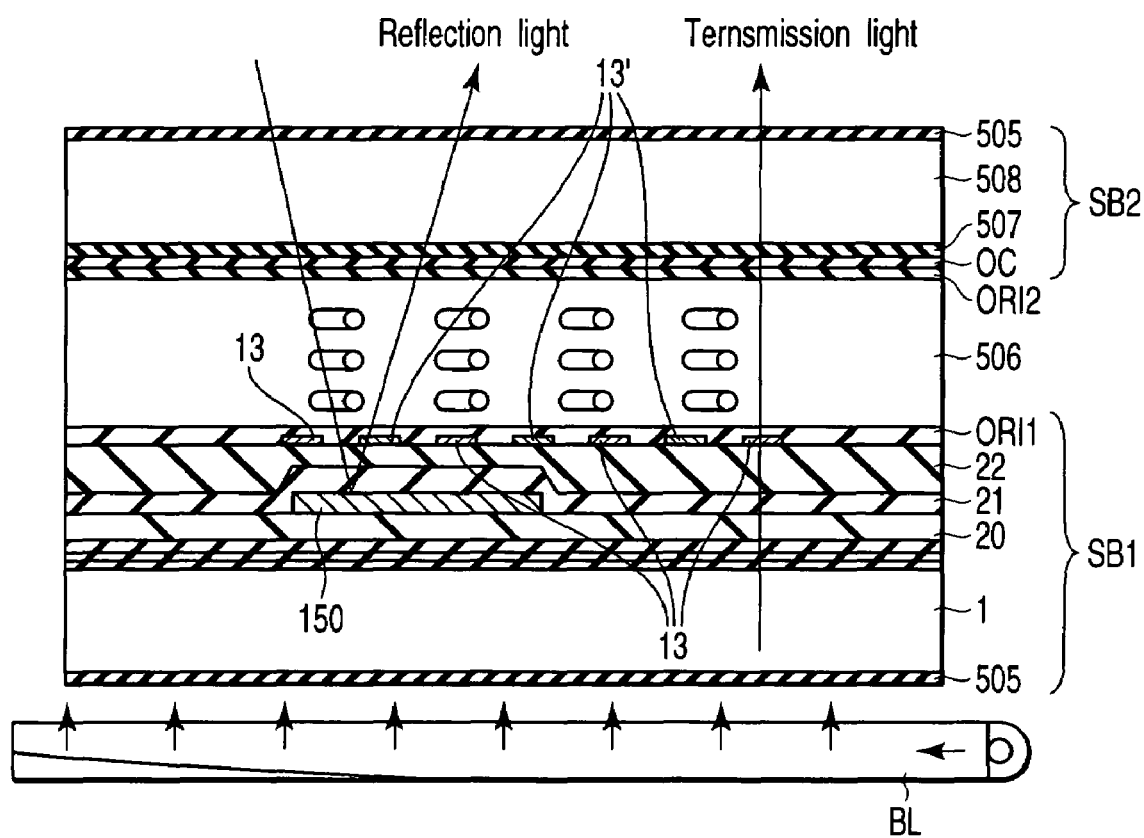
FIG. 22 schematically shows the cross-sectional structure of a semi-transmission-type active matrix liquid crystal display according to a fourth embodiment of the present invention.
Figure 23:
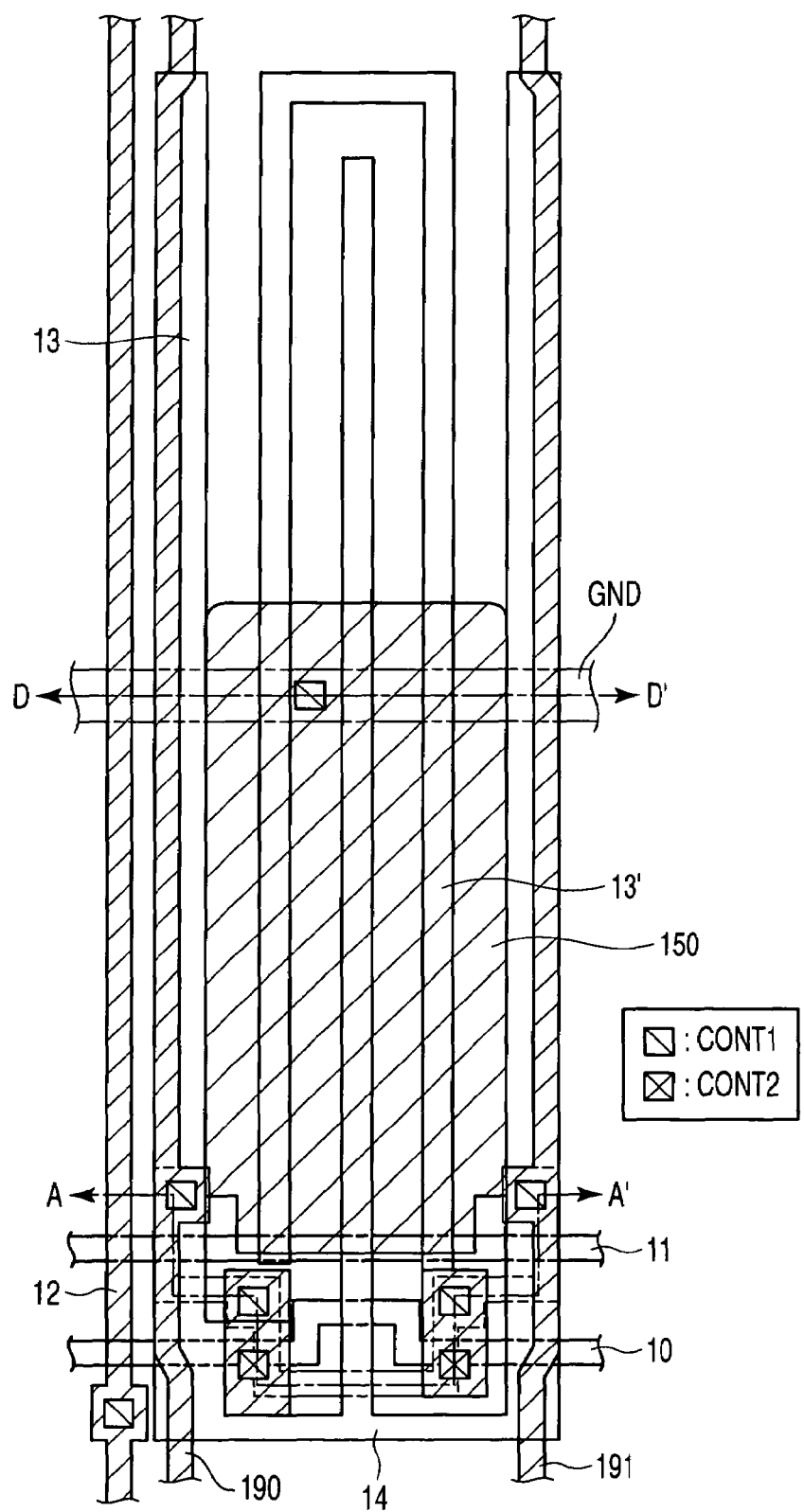
FIG. 23 shows the plan-view structure of a pixel circuit of the liquid crystal display shown in FIG. 22.
Figure 24:
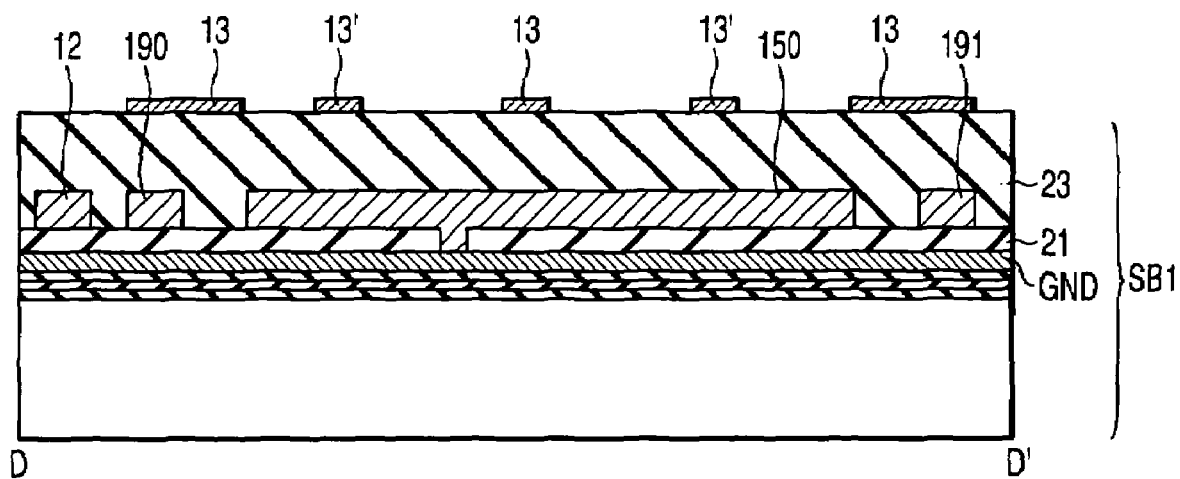
FIG. 24 shows the cross-sectional structure of the pixel circuit, taken along line D-D' in FIG. 23.

A semi-transmission-type active matrix liquid crystal display according to a fourth embodiment of the present invention will now be described. FIG. 22 schematically shows the cross-sectional structure of this liquid crystal display. FIG. 23 shows the plan-view structure of the pixel circuit PX of the liquid crystal display. FIG. 24 shows the cross-sectional structure of the pixel circuit PX, taken along line D-D' in FIG. 23.

This liquid crystal display is substantially the same as the liquid crystal display of the first embodiment, except for the electrode structure that is provided to transmit backlight and reflect ambient light. In FIGS. 22 to 24, the parts similar to those in the first embodiment are denoted by the same reference numerals, and a detailed description thereof is omitted.

The liquid crystal display has the circuit configuration that is described in connection with the first embodiment. A reflection electrode 150, however, is provided in addition to the pixel electrodes 13 and 13' of the first embodiment. The pixel electrodes 13 and 13' are formed of a transparent electrode of, e.g. ITO (Indium Tin Oxide), which has a comb-shaped planar pattern as shown in FIG. 23. The pixel electrodes 13 and 13' passes both ambient light, which is incident via the liquid crystal layer 506, and backlight, which is emitted from the backlight BL. The reflection electrode 150 is a metal film that reflects ambient light that has passed through the pixel electrode 13, 13'. In FIG. 22, a metal film of tungsten (W) is formed as the reflection electrode 150 on the gate insulation film 20. The reflection electrode 150 may be a three-layer metal film of Mo/Al/Mo that is formed on the interlayer insulation film 21. In this liquid crystal display, that part of the pixel area, which is occupied by the reflection electrode 150, constitutes a reflection display section, and that part of the pixel area, which excludes the reflection display section, constitutes a transmission display section. The reflection electrode 150 is connected via a contact through-hole to the common electrode line GND that is set at a ground potential. In this case, the liquid crystal layer 506 is driven by a lateral electric field that is created between the pixel electrodes 13 and 13', and a fringe electric field that is created between the pixel electrode 13, 13' and the reflection electrode 150 and serves as a substantially lateral electric field in the liquid crystal layer 506. Thereby, the uniformity of the electric field between the pixel electrodes 13 and 13' is enhanced, and a high-quality display image can be obtained.

In this embodiment, the same advantages as with the first embodiment can be obtained by the semi-transmission-type active matrix liquid crystal display that displays an image using transmission light and reflection light.

Figure 25:
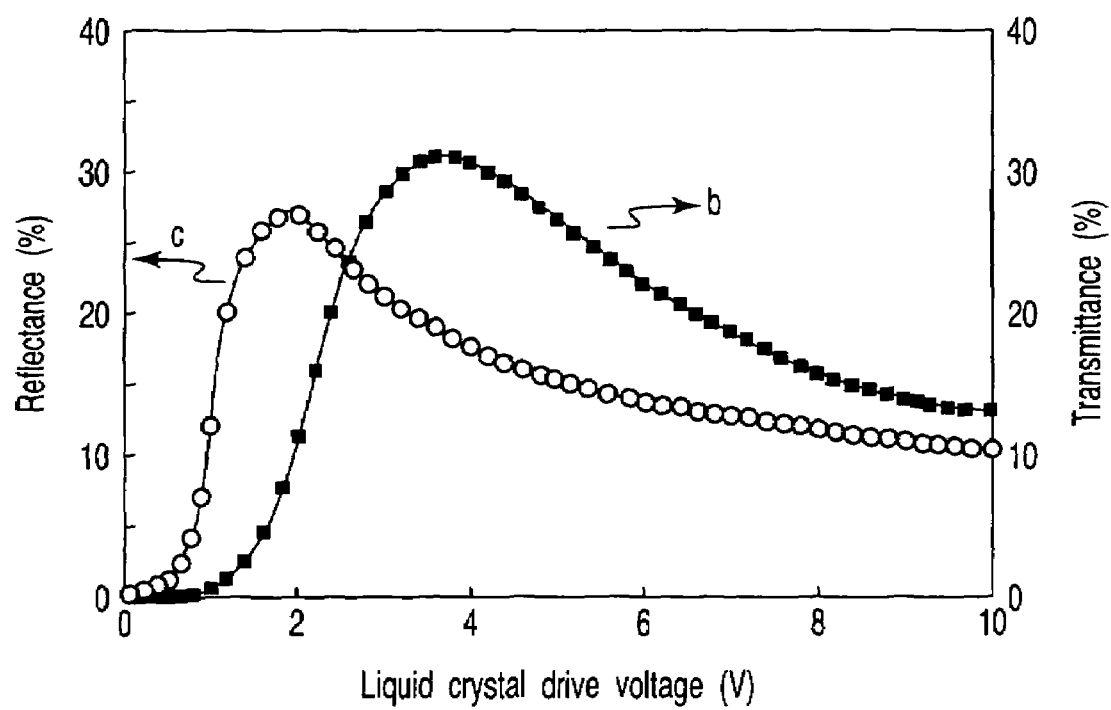
FIG. 25 is a graph showing the voltage-luminance characteristic of the liquid crystal display shown in FIG. 22.

FIG. 25 shows the voltage-luminance characteristic of this liquid crystal display. In FIG. 25, a curve b indicates the dependency of the transmittance of the transmission display section on the liquid crystal drive voltage, and a curve c indicates the dependency of the reflectance of the reflection display section on the liquid crystal drive voltage. A good voltage-luminance characteristic is obtained both in reflection display and transmission display. The semi-transmission type liquid crystal display that uses both reflection light and transmission light is suitably applied to a small-sized device, such as a portable phone or a portable information terminal, which is frequently used outdoors. Making use of the pixel structure of this embodiment, the power consumption of the device can be reduced according to the decrease in the drive voltage. Moreover, high-quality image display can be realized by the wide viewing angle, which is an advantage of the lateral electric field drive scheme.

Fifth Embodiment

Figure 26:
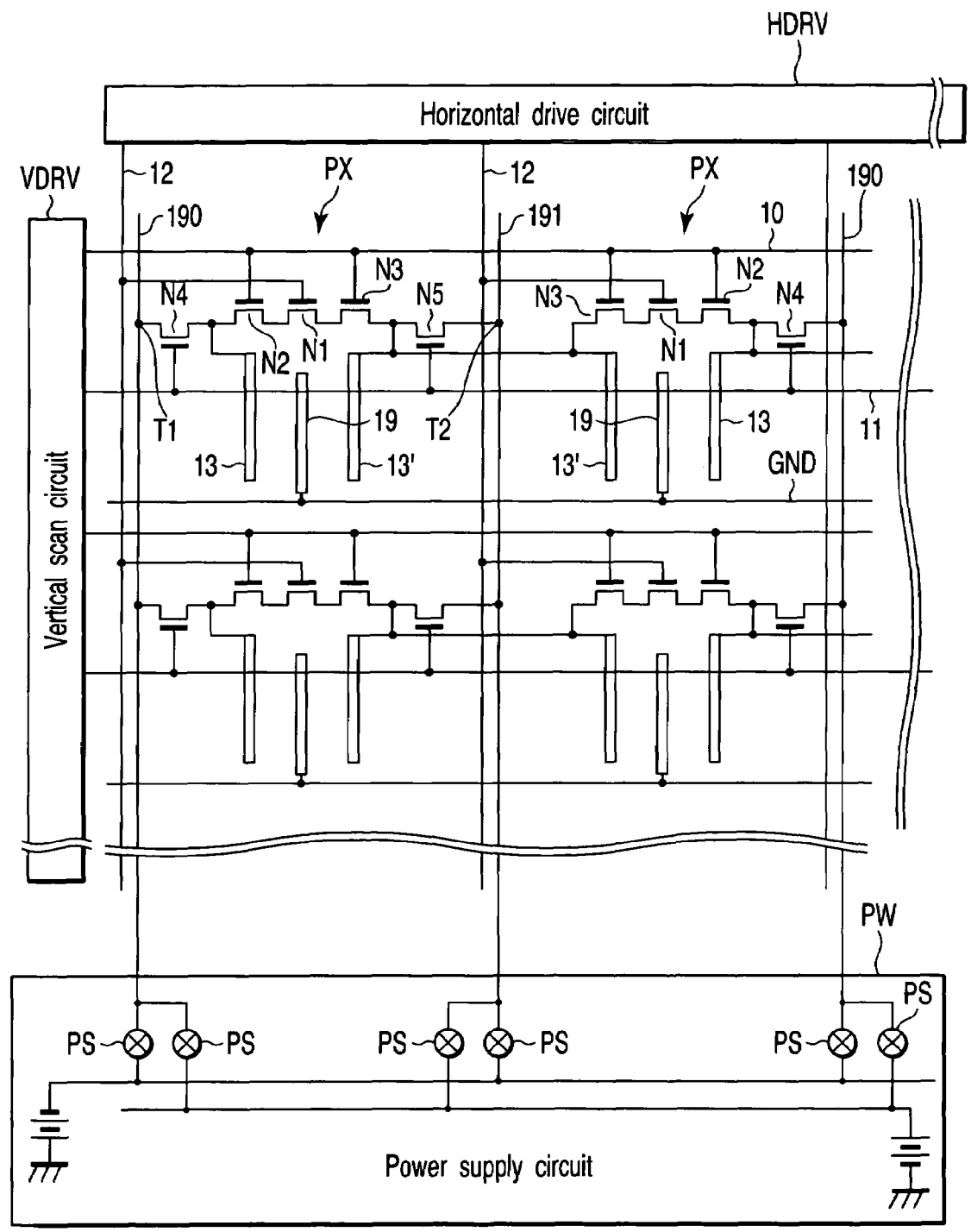
FIG. 26 schematically shows the plan-view structure of an active matrix liquid crystal display according to a fifth embodiment of the present invention.
Figure 27:
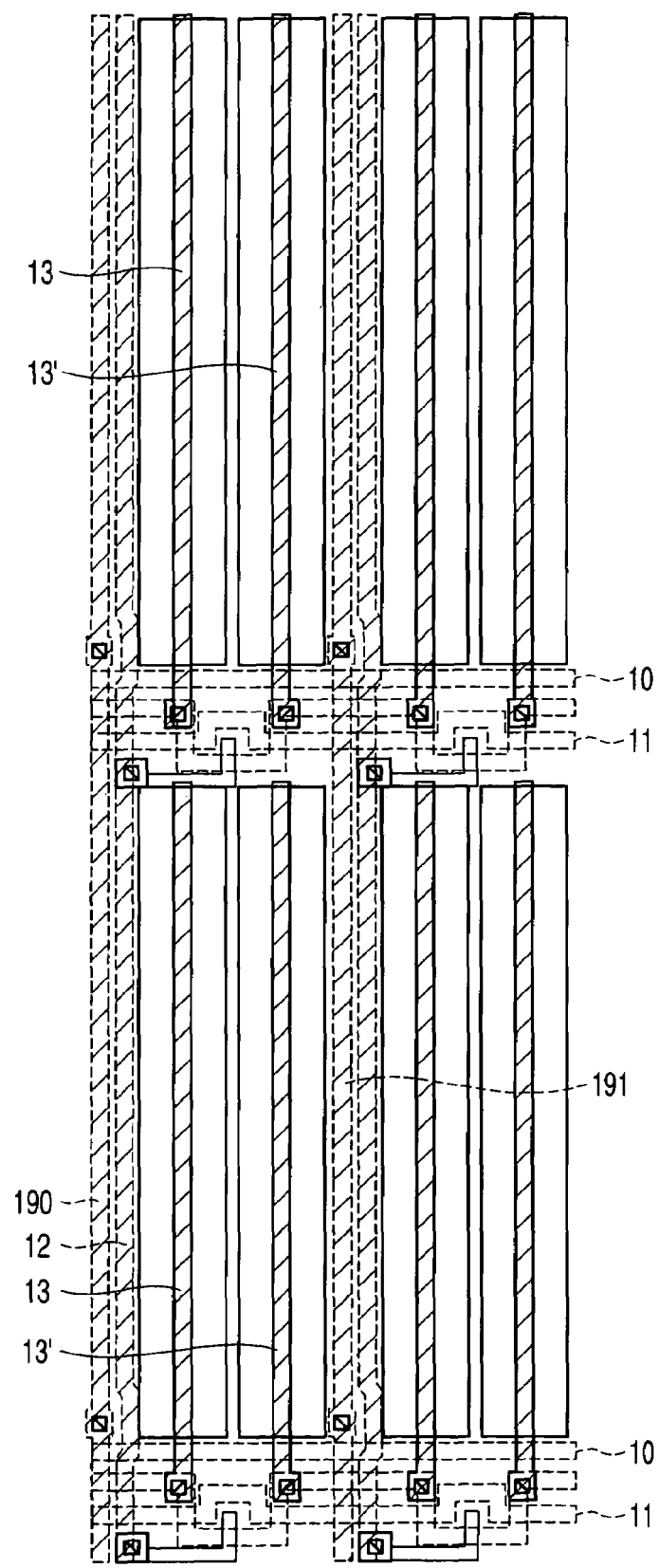
FIG. 27 shows the plan-view structure of a pixel circuit of the liquid crystal display shown in FIG. 26.

An active matrix liquid crystal display according to a fifth embodiment of the present invention will now be described. FIG. 26 shows an equivalent circuit of this liquid crystal display, and FIG. 27 shows the plan-view structure of the pixel circuit PX of the liquid crystal display.

This liquid crystal display is substantially the same as the liquid crystal display of the second embodiment, except for the structure in which at least a part of the precharge circuit is shared by adjacent pixel circuits PX. In FIGS. 26 and 27, the parts similar to those in the second embodiment are denoted by the same reference numerals, and a detailed description thereof is omitted.

In this liquid crystal display, two adjacent pixel circuits PX share the transistors N4 and N5, thereby decreasing the number of power lines 190, 191. Specifically, one end of the current path of the transistor N4 is connected to the power terminal T1 of the power line 190, and the other end of the current path of the transistor N4 is connected to the pixel electrode 13 of one pixel circuit PX and to the pixel electrode 13 of the other pixel circuit PX. In addition, one end of the current path of the transistor N5 is connected to the power terminal T2 of the power line 191, and the other end of the current path of the transistor N5 is connected to the pixel electrode 13' of one pixel circuit PX and to the pixel electrode 13' of the other pixel circuit PX. Since the precharge potentials and the waveforms of AC voltage applied to the power lines 190 and 191 are common in all the pixel circuits PX, there arises no operational problem even if the power lines 190 and 191 and the transistors for precharging are shared.

In this embodiment, the number of components that are to be disposed in the pixel area can be reduced, and the pixel aperture ratio can advantageously be increased.

Sixth Embodiment

Figure 28:
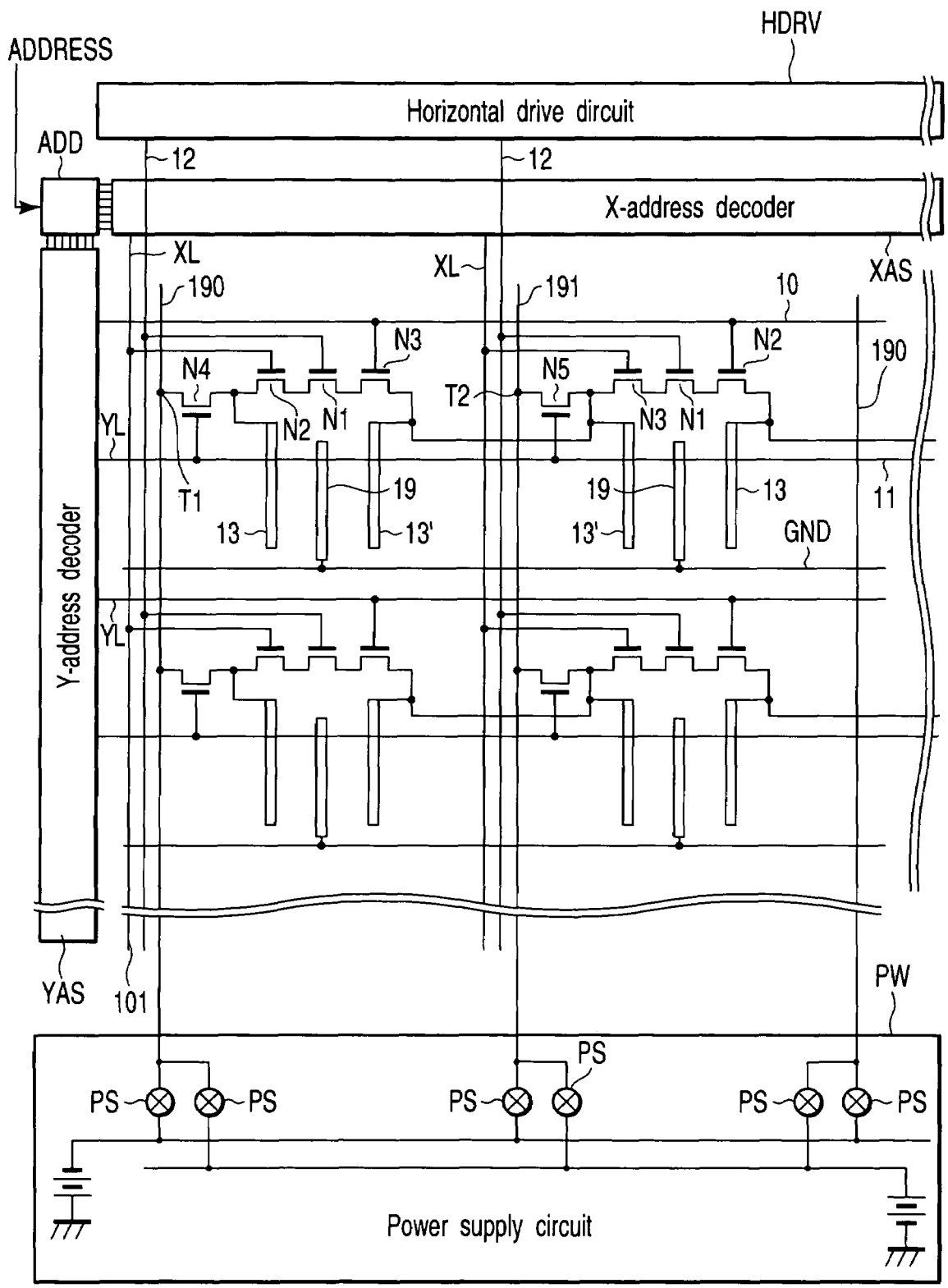
FIG. 28 schematically shows the plan-view structure of an active matrix liquid crystal display according to a sixth embodiment of the present invention.

An active matrix liquid crystal display according to a sixth embodiment of the present invention will now be described. FIG. 28 schematically shows an equivalent circuit of this liquid crystal display.

This liquid crystal display has substantially the same architecture as that of the liquid crystal display of the fifth embodiment, except for the structure in which a plurality of pixel circuits PX are random-accessed. In FIG. 28, the parts similar to those in the fifth embodiment are denoted by the same reference numerals, and a detailed description thereof is omitted.

As is shown in FIG. 28, in this liquid crystal display, the support substrate SB1 additionally includes a plurality of Y-address lines YL that are arranged along the rows of pixel circuits PX; a plurality of X-address lines XL that are arranged along the columns of pixel circuits PX; a Y-address decoder YAS that drives the Y-address lines YL and a plurality of precharge control lines 11; an X-address decoder XAS that drives the X-address lines XL; and an address decoder ADD that controls the Y-address decoder YAS and the X-address decoder XAS. In each pixel circuit PX, the gate of the transistor N3 is connected to one Y-address line YL, and the gate of the transistor N2 is connected to one X-address line XL. The gates of the transistors N4 and N5 are connected to the precharge control line 11. An address signal ADDRESS is supplied from the outside to the address decoder ADD via an address bus. A video signal for one pixel is supplied to the horizontal drive circuit HDRV in synchronism with the address signal ADDRESS. The horizontal drive circuit HDRV is configured to output the video signal voltage Vs to one of the video signal lines 12 in units of one pixel video signals.

In the structure shown in FIG. 26, the scan lines 10 and the vertical scan circuit VDRV are provided on the support substrate SB1. In the fifth embodiment, however, these components are needless.

When an address signal is input to the decoder ADD, the decoder ADD divides the address signal into a Y-address signal and an X-address signal and delivers the Y-address signal and X-address signal to the Y-address decoder YAS and X-address decoder XAS. The Y-address decoder YAS selects one of the precharge control lines 11, which is designated by the Y-address signal, and also selects one of the Y-address lines YL, which is specified by the Y-address signal. The Y-address decoder YAS outputs a select signal, which is equivalent to the select pulse Vpc, to the selected precharge control line 11, and then outputs a select signal, which is equivalent to the select pulse voltage Vg, to the selected Y-address line YL. On the other hand, the X-address decoder XAS selects one of the X-address lines XL, which is specified by the X-address signal, and outputs a select signal, which is equivalent to the select pulse voltage Vg, to the selected X-address line XL. As a result, the transistors N1 to N5 operate in the same manner as in the fifth embodiment.

In this liquid crystal device, one of the pixel circuits PX can be random-accessed. Thus, with respect to only a pixel that requires a luminance variation in the already displayed one-frame image, the video signal voltage Vs can be updated to vary the liquid crystal drive voltage VLC. In this case, the liquid crystal display does not need to be supplied from external video signals for pixels that require no luminance variation. Hence, the transfer rate of the video signal can greatly be reduced. Therefore, the total power consumption of the liquid crystal device can be reduced.

Moreover, since the random-access scheme is adopted, the video signal voltage Vs for other pixels can be prevented from being adversely affected.

In the prior art, logic gate circuits such as AND gates are used to implement random-addressing. Thus, four or six transistors are additionally required. In the present embodiment, however, the same operational scheme can be realized with a small number of components. Accordingly, a decrease in pixel aperture ratio can be prevented.

Seventh Embodiment

Figure 29:
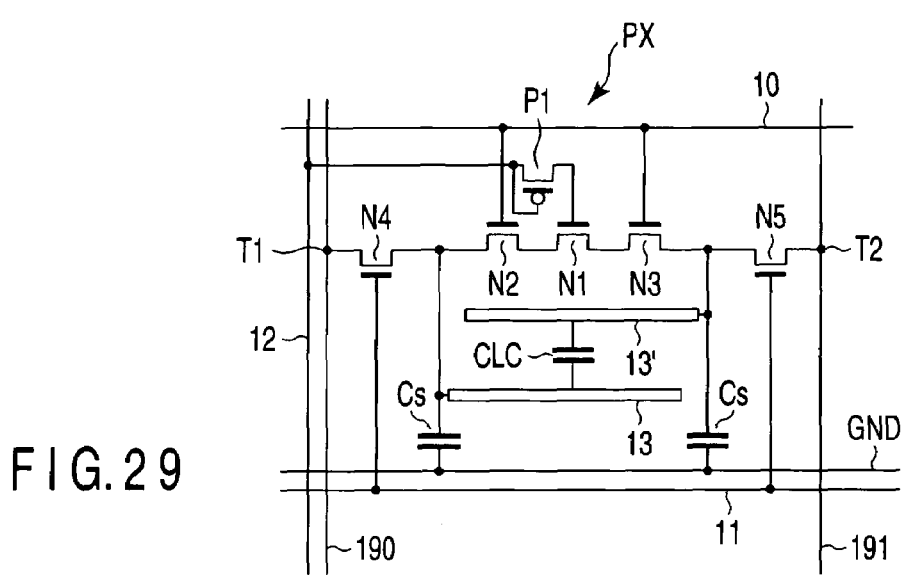
FIG. 29 shows an equivalent circuit of one of pixel circuits that are arrayed in a matrix in a transmission-type active matrix liquid crystal display according to a seventh embodiment according to the present invention.
Figure 30:
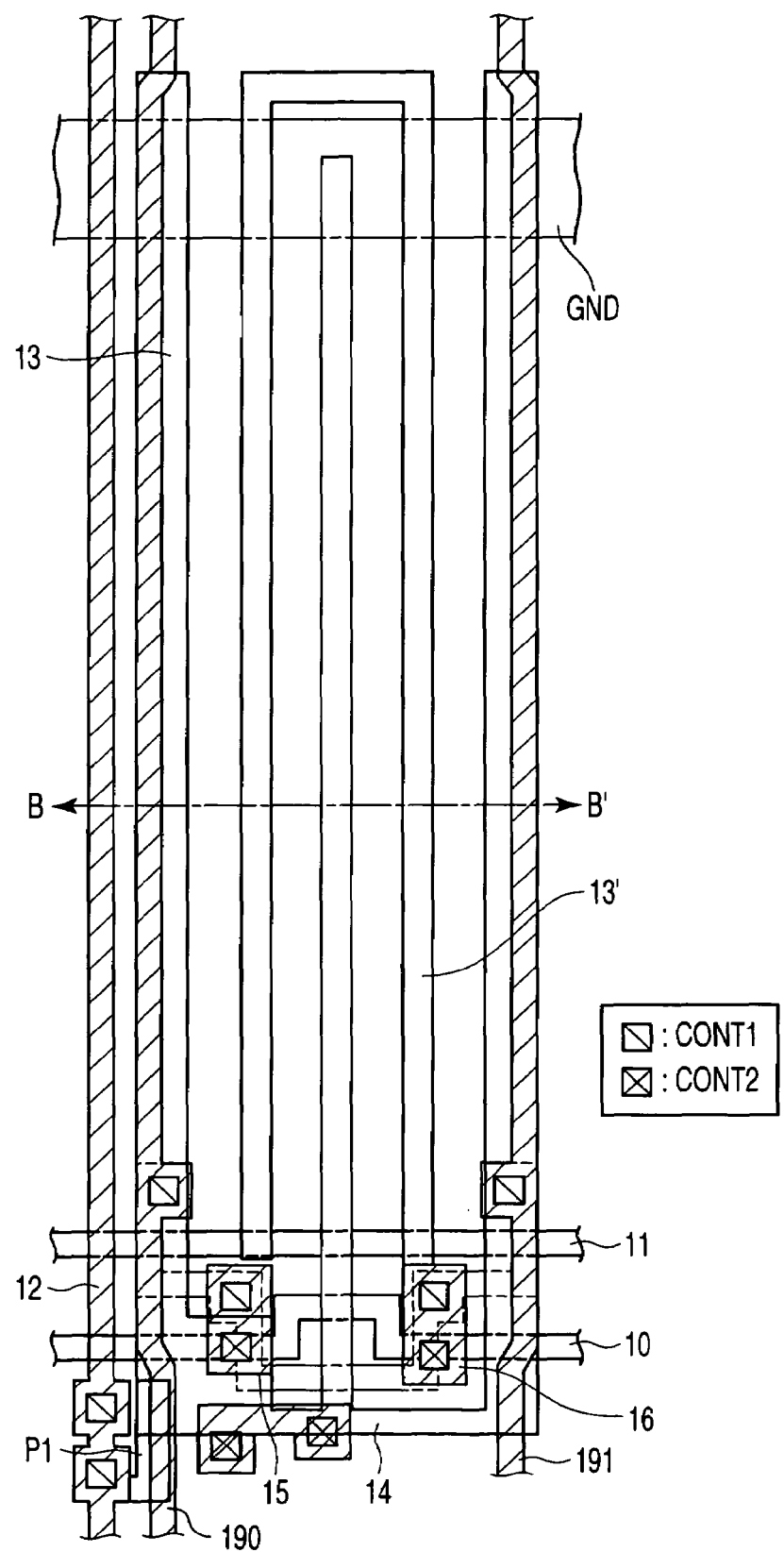
FIG. 30 shows the plan-view structure of the pixel circuit shown in FIG. 29.

A transmission-type active matrix liquid crystal display according to a seventh embodiment of the present invention will now be described. FIG. 29 shows an equivalent circuit of one of pixel circuits PX that are arrayed in a matrix in this liquid crystal display. FIG. 30 shows the plan-view structure of the pixel circuit shown in FIG. 29.

This liquid crystal display is substantially the same as the liquid crystal display of the first embodiment, except for the structure that is provided to cancel a threshold voltage Vt of the transistor N1 of each pixel circuit PX. In FIG. 29 and FIG. 30, the parts similar to those in the first embodiment are denoted by the same reference numerals, and a detailed description thereof is omitted.

In the liquid crystal display, as shown in FIG. 29, a diode-connected P-channel transistor P1 is inserted between the gate of the transistor N1 and the video signal line 12.

With this structure, a voltage Vs+Vtp, which is higher than the video signal voltage Vs by a degree corresponding to a threshold voltage Vtp of the P-channel transistor P1, is applied to the gate of the transistor N1. In this case, a potential difference of 2·(Vs+Vtp−Vt) is obtained between the pixel electrodes 13 and 13' and is applied to the liquid crystal layer 506 as a liquid crystal drive voltage VLC. Symbol Vt designates the threshold voltage of the transistor N1 that is an N-channel transistor. Accordingly, if the absolute value of the threshold voltage Vtp of the P-channel transistor and the absolute value of the threshold voltage Vt of the transistor N1 are equal, i.e. |Vtp|=|Vt|, these are canceled and the potential difference between the pixel electrodes 13 and 13' becomes 2Vs. Thus, the liquid crystal drive voltage VLC is not affected by the threshold voltage Vt of the transistor N1.

Figure 31:
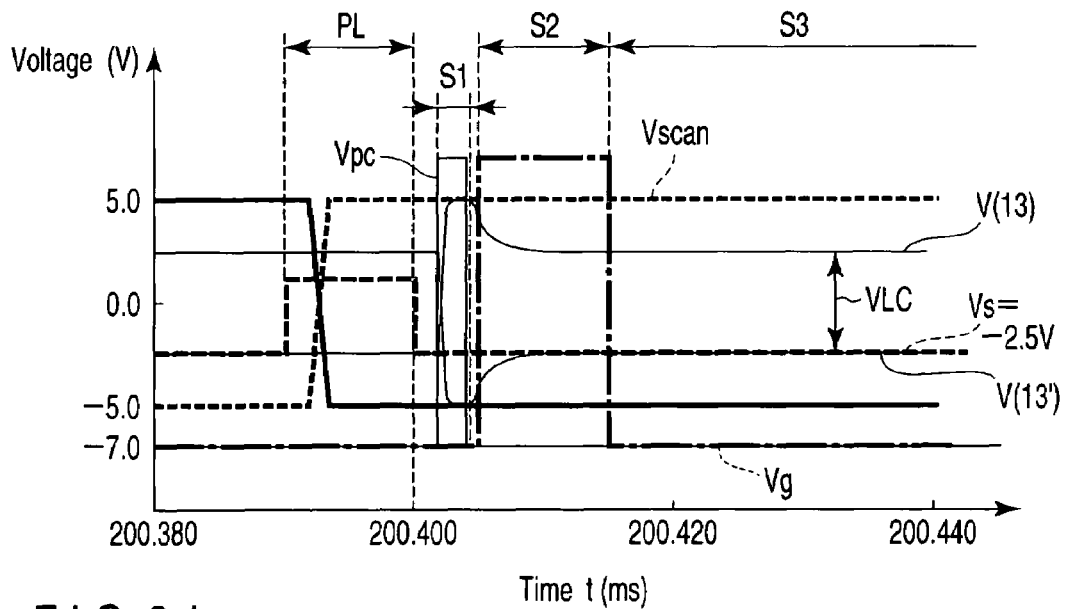
FIG. 31 is a time chart showing the voltage waveforms of the pixel circuit of FIG. 29 in one frame period.
Figure 32:
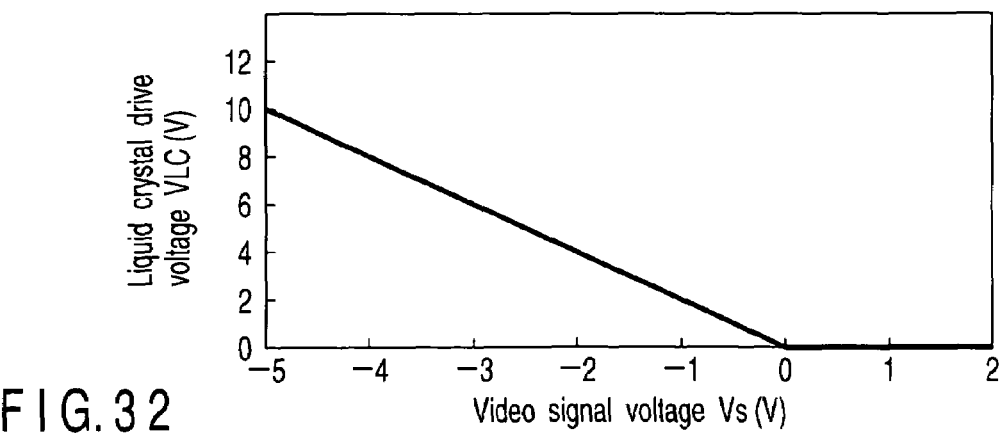
FIG. 32 is a graph showing the voltage input/output characteristic of the pixel circuit shown in FIG. 29.

FIG. 31 shows the voltage waveforms of the pixel circuit PX in one frame period, and FIG. 32 shows the voltage input/output characteristic of the pixel circuit PX. It is understood, from FIG. 32, that since the liquid crystal drive voltage VLC is equal to double the video signal voltage Vs, i.e. 2·Vs, an offset caused by the threshold voltage Vt of the transistor N1 is canceled. Although the operations in the precharge step S1 and video write step S2 are the same as in the first embodiment, attention needs to be paid to the waveform of the video signal voltage Vs, which is indicated by a dot-and-dash line in FIG. 31.

In the present embodiment, directivity that is given by diode connection is imparted to the P-channel transistor P1 inserted in the gate input stage of the transistor N1. Consequently, there may be a case where the operation of the video write step S2 cannot normally be executed because of the relationship in magnitude between a video signal voltage Vs that has previously charged the gate of the transistor N1 and a video signal voltage Vs that is to newly charge the gate of the transistor N1.

Assume that a video signal voltage Vs of −4V has been applied to one pixel circuit PX in a first frame period. In this case, the gate of the transistor N1 is set at a potential of −4V+Vtp, which is obtained by adding an offset of the threshold voltage Vtp of the P-channel transistor Pi to the video signal voltage Vs. Subsequently, if a video signal voltage Vs of −1V is applied in a second frame period, the diode-connected P-channel transistor P1 is reverse-biased. Consequently, the gate potential of the transistor N1 is not charged at −1V, and the charge that is previously retained in the gate of the transistor N1 remains unchanged. If the relationship in magnitude between the preceding and following stages is reversed, the diode-connected P-channel transistor P1 is forward-biased and the gate potential of the transistor N1 can be charged at −1V. Therefore, the liquid crystal drive voltage VLC can normally be refreshed by the operation of the transistor N1.

As described above, if the device with directivity is inserted, asymmetry, which depends on the relationship in potential between the preceding and following stages of the device, will occur in the operation of the transistor N1. To prevent this problem, the horizontal drive circuit HDRV outputs a video signal voltage Vs, which is properly biased to the positive potential side for only a predetermined time period PL, as indicated by the dot-and-dash line in FIG. 31. Thereby, the gate potential of the transistor N1 is reset at a potential of 0V or more. Accordingly, when a new video signal voltage Vs is supplied to the gate of the transistor N1, the potential of the video signal line 12 once falls below the gate potential of transistor N1 without fail. Therefore, the above-mentioned problem can be solved.

In the above-described embodiments, the first to third transistors N1 to N3 are formed of N-channel transistors. Alternatively, all of these N-channel transistors may be replaced with P-channel transistors. If the transistor N1 has a PMOS structure, a negative input voltage can be applied. If the second and third transistors N1 and N3 have a PMOS structure, the absolute value of the liquid crystal drive voltage VLC becomes lower than the input voltage by a degree corresponding to the threshold voltage Vt of the transistor N1, N3. In a case where the input voltage absolute value is less than Vt, the liquid crystal drive voltage VLC becomes 0. In particular, if the second transistor N2 has a PMOS structure whose source-drain withstand voltage is high, a higher liquid crystal drive voltage VLC can be obtained. In addition, compared to the NMOS structure, the PMOS structure is less degraded by hot carriers and, therefore, a highly reliable display device can be constructed.

Figure 33:
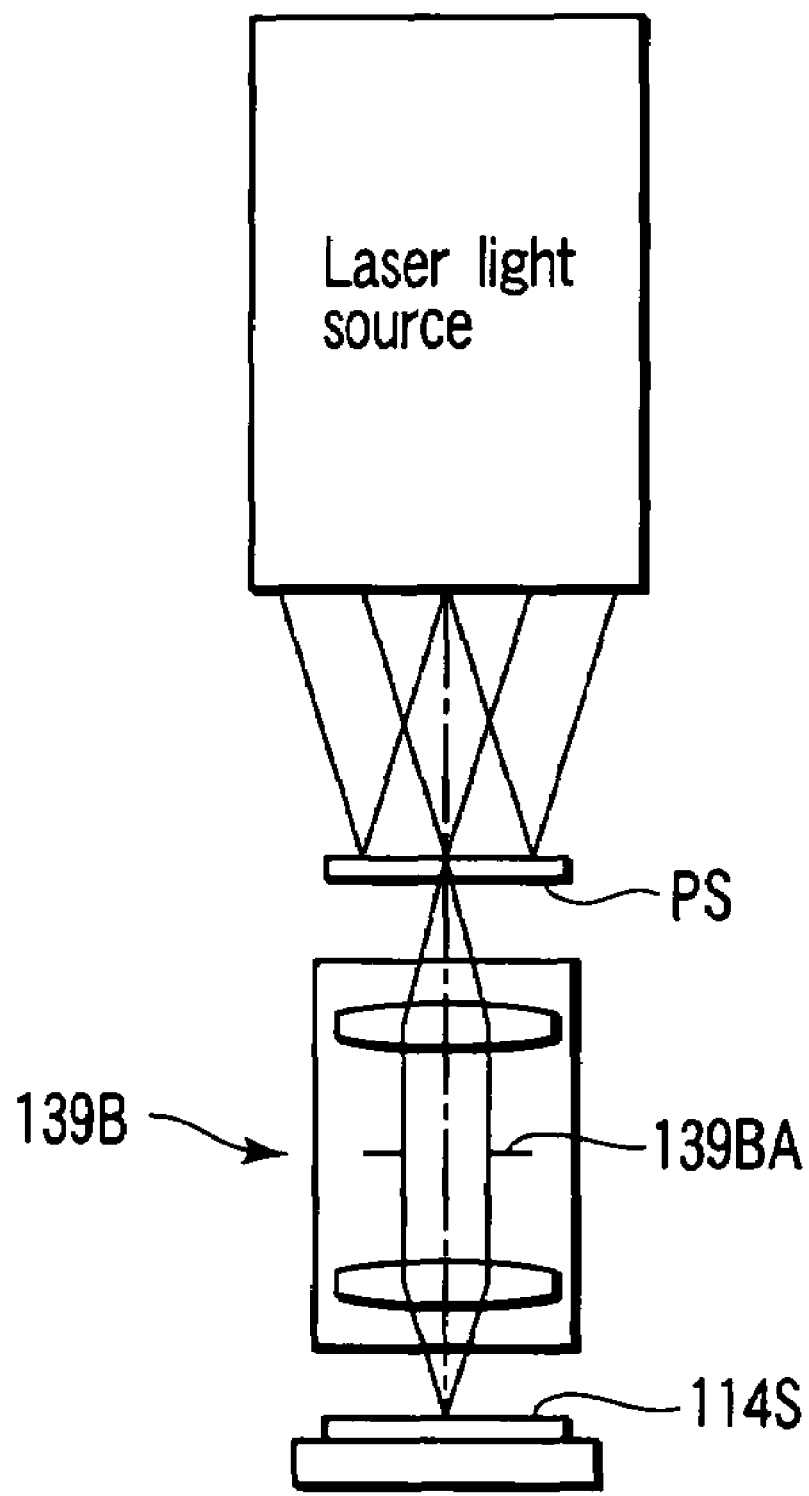
FIG. 33 is a view showing a laser crystallization apparatus for recrystallizing a non-single crystal semiconductor film into a single crystal semiconductor film used to form thin-film transistors.

Further, the thin-film transistors in the abovementioned embodiments may be formed using a single crystal semiconductor film which is obtained as a result of recrystllization of a non-single crystal semiconductor film effected by a laser crystallization apparatus. This laser crystallization apparatus may have a structure shown in FIG. 33. In this apparatus, an optical imaging system 139B is disposed between a phase shifter PS and a thin-film semiconductor substrate 114S to locate the phase shifter PS and thin-film semiconductor substrate 114S at the optically conjugated positions. That is, the thin-film semiconductor substrate 114S is set in a plane optically conjugated with the phase shifter PS (image plane of the optical imaging system 139B). An aperture diaphragm unit 139BA is disposed in an iris plane of the optical imaging system 139B. The aperture diaphragm unit 139BA includes a plurality of aperture diaphragms different from one another in the size of the aperture (light transmission portion), and these aperture diaphragms can be changed with respect to an optical path. Instead, the aperture diaphragm unit 139BA may be formed of an iris diaphragm that can continuously change the size of the aperture. In any case, the size of the aperture of the aperture diaphragm unit 139BA (numerical aperture NA on the imaging side of the optical imaging system 139B) is set to obtain a required light intensity distribution of the inverse peak pattern on the semiconductor thin film 114 of the thin-film semiconductor substrate 114S. In addition, the optical imaging system 139B may be a refractive optical system, reflective optical system, or a refractive and reflective optical system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal pixel memory comprising:
   first and second power terminals that are set at potentials of opposite polarities, respectively, each of the potentials having a predetermined level difference relative to a reference potential;
   first and second pixel electrodes that retain charges supplied from the first and second power terminals, respectively, and apply a potential difference obtained by the retained charges to a liquid crystal layer as a liquid crystal drive voltage that creates within the liquid crystal layer a lateral electric field that is substantially horizontal to a plane of a substrate;
   an input transistor having source and drain electrodes and a gate electrode connected to a video signal line;
   a pair of first switch transistors that are connected between the first pixel electrode and the first power terminal and between the second pixel electrode and the second power terminal, respectively, to precharge the first and second pixel electrodes at the potentials of the first and second power terminals; and
   a pair of second switch transistors that are connected between the source electrode of the input transistor the first pixel electrodes and between the drain electrode of the input transistor and the second pixel electrode, respectively, to redistribute the charges retained in the first and second pixel electrodes in accordance with a value of a video signal that is input to the gate electrode of the input transistor.

2. The liquid crystal pixel memory according to claim 1, wherein the first and second power terminals are connected to a power supply circuit that changes a voltages applied to the first and second power terminals such that a polarity of the liquid crystal drive voltage is cyclically reversed.

3. The liquid crystal pixel memory according to claim 2, wherein the power supply circuit is configured to supply AC voltages, which are alternating between a first level and a second level, to the first and second power terminals with a phase difference of 180°.

4. The liquid crystal pixel memory according to claim 1, further comprising a sample and hold circuit that includes a sampling transistor, which takes in the video signal, and a capacitance element, which retains the video signal that is sampled by the sampling transistor and applies the video signal to the gate electrode of the input transistor.

5. The liquid crystal pixel memory according to claim 1, further comprising a common electrode that is disposed between the first and second pixel electrodes and is set at the reference potential.

6. The liquid crystal pixel memory according to claim 1, wherein the input transistor is an N-channel transistor that is connected to receive the video signal via a diode-connected P-channel transistor.

7. A method of driving a liquid crystal pixel memory including: first and second power terminals that are set at potentials of opposite polarities, respectively, each of the potentials having a predetermined level difference relative to a reference potential; first and second pixel electrodes that retain charges supplied from the first and second power terminals, respectively, and apply a potential difference obtained by the retained charges to a liquid crystal layer as a liquid crystal drive voltage that creates within the liquid crystal layer a lateral electric field that is substantially horizontal to a plane of a substrate; and an input transistor having a gate electrode that receives a video signal, the method comprising:
   a step of connecting the first and second pixel electrodes to the first and second power terminals to precharge the first and second pixel electrodes at the potentials of the first and second power terminals; and
   a step of disconnecting the first and second pixel electrodes from the first and second power terminals and then connecting the first and second pixel electrodes to source and drain electrodes of the input transistor to redistribute the charges retained in the first and second pixel electrodes in accordance with a value of the video signal that is input to the gate electrode of the input transistor, thereby determining the potentials of the first and second pixel electrodes.

8. The method of driving a liquid crystal pixel memory, according to claim 7, wherein a the voltages applied to the first and second power terminals is changed such that a polarity of the liquid crystal drive voltage is cyclically reversed.

9. The method of driving a liquid crystal pixel memory, according to claim 8, wherein AC voltages, which are alternating between a first level and a second level, are supplied to the first and second power terminals with a phase difference of 180°, thereby to change the relationship in potential between the first and second power terminals.

10. The method of driving a liquid crystal pixel memory, according to claim 8, wherein the video signal from one of video signal lines is sampled by a sample and hold circuit and continuously output to the gate electrode of the input transistor.

11. The method of driving a liquid crystal pixel memory, according to claim 8, wherein a refresh cycle of the video signal is non-coincident with a cycle of reversing the liquid crystal drive voltage.

12. The method of driving a liquid crystal pixel memory, according to claim 8, wherein a refresh cycle of the video signal is longer than a cycle of reversing the liquid crystal drive voltage.

13. A liquid crystal display comprising:
a pair of support substrates;
a liquid crystal layer that is held between the pair of support substrates; and
a plurality of pixel circuits that are arrayed in a matrix on one of the support substrates and control the alignment state of liquid crystal molecules, each of the pixel circuits including:
first and second power terminals that are set at potentials of opposite polarities, respectively, each of the potentials having a predetermined level difference relative to a reference potential;
first and second pixel electrodes that retain charges supplied from the first and second power terminals, respectively, and apply a potential difference obtained by the retained charges to the liquid crystal layer as a liquid crystal drive voltage that creates within the liquid crystal layer a lateral electric field that is substantially horizontal to a plane of the substrate;
an input transistor having source and drain electrodes and a gate electrode that receives a video signal; and
a switch circuit having a function of connecting the first and second pixel electrodes to the first and second power terminals to precharge the first and second pixel electrodes at the potentials of the first and second power terminals, and connecting the first and second pixel electrodes to one and the other of the source and drain electrodes of the input transistor to redistribute the charges retained in the first and second pixel electrodes in accordance with a value of the video signal that is input to the gate electrode of the input transistor.

14. The liquid crystal display according to claim 13, wherein the first and second power terminals are connected to a power supply circuit that changes the voltages applied to the first and second power terminals such that a polarity of the liquid crystal drive voltage is cyclically reversed.

15. The liquid crystal display according to claim 14, wherein the support substrate includes a plurality of scan lines that are arranged along the rows of pixel circuits, a plurality of precharge control lines that are arranged along the rows of pixel circuits, and a plurality of video signal lines that are arranged along the columns of pixel circuits,
each of the pixel circuits is disposed in one of pixel areas that are defined by said plurality of scan lines and said plurality of video signal lines,
the switch circuit of each of the pixel circuits includes first and second connection transistors each having a gate electrode connected to one of said plurality of precharge control lines, and third and fourth connection transistors each having a gate electrode connected to one of said plurality of scan lines,
the first and second pixel electrodes are connected to the first and second power terminals via source and drain electrodes of the first and second connection transistors, and the first and second pixel electrodes are connected to one and the other of the source and drain electrodes of the input transistor via source and drain electrodes of the third and fourth connection transistors, and
the gate electrode of the input transistor is connected to receive the video signal from one of said plurality of video signal lines.

16. The liquid crystal display according to claim 15, wherein each of the pixel circuits further comprises a sample and hold circuit that includes a sampling transistor, which samples the video signal, and a capacitance element, which retains the video signal that is sampled by the sampling transistor and applies the video signal to the gate electrode of the input transistor.

17. The liquid crystal display according to claim 16, wherein the support substrate further includes a plurality of second scan lines that are arranged along the rows of pixel circuits, and a gate of the sampling transistor is connected to one of said plurality of second scan lines.

18. The liquid crystal display according to claim 15, wherein the support substrate includes pairs of power lines that constitute the first and second power terminals of said plurality of pixel circuits and are connected to the power supply circuit.

19. The liquid crystal display according to claim 18, wherein the third and fourth connection transistors and the first and second power lines are shared by adjacent two of the pixel circuits.

20. The liquid crystal display according to claim 13, further comprising a common electrode that is disposed between the first and second pixel electrodes and is set at the reference potential.

21. The liquid crystal display according to claim 13, wherein the first and second pixel electrodes are comb-shaped transparent electrodes that are disposed in an intermeshing fashion.

22. The liquid crystal display according to claim 21, wherein each of the pixel circuits includes a reflection electrode that partly overlaps the first and second pixel electrodes via an insulation film.

23. The liquid crystal display according to claim 13, wherein the input transistor is an N-channel transistor that is connected to receive the video signal via a diode-connected P-channel transistor.

24. A liquid crystal display comprising:
a liquid crystal layer that is provided between a pair of support substrates;
a plurality of pixel circuits that are arrayed in a matrix on one of the support substrates and control the alignment state of liquid crystal molecules;
a plurality of first address lines that are arranged along the rows of pixel circuits;
a plurality of precharge control lines;
a plurality of second address lines that are arranged along the columns of pixel circuits; and a plurality of video signal lines that are arranged along the columns of pixel circuits,
wherein each of the pixel circuits is disposed in one of pixel areas that are defined by the first address lines and the second address lines,
each of the pixel circuits includes:
first and second power terminals that are set at potentials of opposite polarities, respectively, each of the potentials having a predetermined level difference relative to a reference potential;
first and second pixel electrodes that retain charges supplied from the first and second power terminals, respectively, and apply a potential difference obtained by the retained charges to the liquid crystal layer as a liquid crystal drive voltage that creates within the liquid crystal layer a lateral electric field that is substantially horizontal to a plane of the substrate; an input transistor having a gate, source and drain electrodes;
first and second connection transistors each having a gate electrode connected to one of the precharge control lines; a third connection transistor having a gate electrode connected to one of the first address lines; and a fourth connection transistor having a gate electrode connected to one of the first address lines, the first and second pixel electrodes are connected to the first and second power terminals via source and drain electrodes of the first and second connection transistors, and the first and second pixel electrodes are connected to one and the other of the source and drain electrodes of the input transistor via source and drain electrodes of the third and fourth connection transistors; and the gate electrode of the input transistor is connected to receive a video signal from one of the video signal lines.

25. A method of driving a liquid crystal display including: a pair of support substrates; a liquid crystal layer that is provided between the pair of support substrates; and a plurality of pixel circuits that are arrayed in a matrix on one of the support substrates and control the alignment state of liquid crystal molecules, each of the pixel circuits including: first and second power terminals that are set at potentials of opposite polarities, respectively, each of the potentials having a predetermined level difference relative to a reference potential; first and second pixel electrodes that retain charges supplied from the first and second power terminals, respectively, and apply a potential difference obtained by the retained charges to the liquid crystal layer as a liquid crystal drive voltage that creates within the liquid crystal layer a lateral electric field that is substantially horizontal to a plane of the substrate; and an input transistor having a gate electrode that receives a video signal and redistributes the charges retained in the first and second pixel electrodes in accordance with the video signal, the method comprising:

a step of connecting the first and second pixel electrodes to the first and second power terminals to precharge the first and second pixel electrodes at the potentials of the first and second power terminals; and a step of disconnecting the first and second pixel electrodes from the first and second power terminals and then connecting the first and second pixel electrodes to source and drain electrodes of the input transistor to redistribute the charges retained in the first and second pixel electrodes in accordance with a value of the video signal that is input to the gate electrode of the input transistor, thereby determining potentials of the first and second pixel electrodes.

26. The method of driving a liquid crystal display, according to claim 25, wherein the video signal is supplied to the gate electrode of the input transistor via a diode-connected transistor having a polarity opposite to a polarity of the input transistor, and the method further includes:

a step of setting, at a time of supplying the video signal, the gate potential of the input transistor at such a voltage level that the diode-connected transistor having the polarity opposite to the polarity of the input transistor is prevented from being reverse-biased; and a step of subsequently supplying the video signal.

27. The method of driving a liquid crystal display, according to claim 25, wherein the video signal is unipolar.

28. The method of driving a liquid crystal pixel memory, according to claim 25, wherein the voltages applied to the first and second power terminals is changed such that a polarity of the liquid crystal drive voltage is cyclically reversed.

29. The method of driving a liquid crystal pixel memory, according to claim 28, wherein AC voltages, which are alternating between a first level and a second level, are supplied to the first and second power terminals with a phase difference of 180°, thereby to change the relationship in potential between the first and second power terminals.

30. The method of driving a liquid crystal pixel memory, according to claim 28, wherein the video signal is sampled by a sample and hold circuit and continuously output to the gate electrode of the input transistor.

31. The method of driving a liquid crystal pixel memory, according to claim 28, wherein a refresh cycle of the video signal is non-coincident with a cycle of reversing the liquid crystal drive voltage.

32. The method of driving a liquid crystal pixel memory, according to claim 28, wherein a refresh cycle of the video signal is longer than a cycle of reversing the liquid crystal drive voltage.

* * * * *